United States Patent
Yamazaki

(10) Patent No.: US 10,360,858 B2
(45) Date of Patent: Jul. 23, 2019

(54) DISPLAY DEVICE INCLUDING OPTICAL SENSOR AND DRIVING METHOD THEREOF

(71) Applicant: SEMICONDUCTOR ENERGY LABORATORY CO., LTD., Atsugi-shi, Kanagawa-ken (JP)

(72) Inventor: Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 552 days.

(21) Appl. No.: 14/802,001

(22) Filed: Jul. 17, 2015

(65) Prior Publication Data

US 2016/0019847 A1    Jan. 21, 2016

Related U.S. Application Data

(62) Division of application No. 12/964,405, filed on Dec. 9, 2010, now Pat. No. 9,087,489.

(30) Foreign Application Priority Data

Dec. 18, 2009   (JP) ................................ 2009-288511

(51) Int. Cl.
   *G09G 3/20*   (2006.01)
   *G09G 3/34*   (2006.01)
   (Continued)

(52) U.S. Cl.
   CPC ....... *G09G 3/3413* (2013.01); *G02F 1/13318* (2013.01); *G09G 3/2003* (2013.01);
   (Continued)

(58) Field of Classification Search
   CPC .. G09G 3/3413; G09G 3/2003; G09G 3/3648; G09G 3/3696; G09G 3/3225;
   (Continued)

(56) References Cited

U.S. PATENT DOCUMENTS

| | | |
|---|---|---|
| 5,482,173 A | 1/1996 | Park et al. |
| 5,731,856 A | 3/1998 | Kim et al. |

(Continued)

FOREIGN PATENT DOCUMENTS

| | | |
|---|---|---|
| CN | 101446704 A | 6/2009 |
| EP | 1737044 A | 12/2006 |

(Continued)

OTHER PUBLICATIONS

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

(Continued)

*Primary Examiner* — Nathanael R Briggs
(74) *Attorney, Agent, or Firm* — Fish & Richardson P.C.

(57) ABSTRACT

An object is to provide a display device with low power consumption and good display quality. A first substrate is provided with a terminal portion, a pixel electrode, a switching transistor including an oxide semiconductor, a first optical sensor having high optical sensitivity to visible light, and a second optical sensor having optical sensitivity to infrared light and having lower optical sensitivity to visible light than the first optical sensor. The illuminance or color temperature around a display device is detected using the first and second optical sensors, and the luminance or color tone of a display image is adjusted. A second substrate is provided so as to face the first substrate, and is provided with a counter electrode. In a period for displaying a still image, the switching transistor is turned off so that the counter electrode is brought into a floating state.

17 Claims, 19 Drawing Sheets

(51) Int. Cl.
  *G09G 3/36* (2006.01)
  *G02F 1/133* (2006.01)
  *G02F 1/1368* (2006.01)
  *G09G 3/3225* (2016.01)

(52) U.S. Cl.
  CPC ......... *G09G 3/3648* (2013.01); *G09G 3/3696* (2013.01); *G02F 1/1368* (2013.01); *G02F 2001/13312* (2013.01); *G09G 3/3225* (2013.01); *G09G 2300/0426* (2013.01); *G09G 2310/0202* (2013.01); *G09G 2310/0235* (2013.01); *G09G 2320/0295* (2013.01); *G09G 2320/0626* (2013.01); *G09G 2320/0666* (2013.01); *G09G 2330/021* (2013.01); *G09G 2360/14* (2013.01); *G09G 2360/144* (2013.01)

(58) Field of Classification Search
  CPC ... G09G 2300/0426; G09G 2310/0202; G09G 2310/0235; G09G 2320/0295; G09G 2320/0626; G09G 2320/0666; G09G 2330/021; G09G 2360/14; G09G 2360/144; G09G 2360/142; G02F 1/13318; G02F 1/1368; G02F 2001/13312
  See application file for complete search history.

(56) References Cited

U.S. PATENT DOCUMENTS

| | | | |
|---|---|---|---|
| 5,744,864 A | 4/1998 | Cillessen et al. | |
| 6,294,274 B1 | 9/2001 | Kawazoe et al. | |
| 6,563,174 B2 | 5/2003 | Kawasaki et al. | |
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al. | |
| 7,214,922 B2 | 5/2007 | Takiba et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,696,467 B2 | 4/2010 | Takiba et al. | |
| 7,732,819 B2 | 6/2010 | Akimoto et al. | |
| 7,787,082 B2 | 8/2010 | Ito et al. | |
| 7,791,074 B2 | 9/2010 | Iwasaki | |
| 7,894,197 B2 | 2/2011 | Hwang et al. | |
| 7,935,582 B2 | 5/2011 | Iwasaki | |
| 7,956,361 B2 | 6/2011 | Iwasaki | |
| 8,154,024 B2 | 4/2012 | Iwasaki | |
| 8,154,540 B2 * | 4/2012 | Shino | G09G 3/22 345/204 |
| 8,199,083 B2 | 6/2012 | Fukunaga et al. | |
| 8,395,148 B2 | 3/2013 | Yamazaki et al. | |
| 8,446,390 B2 | 5/2013 | Hattori | |
| 8,514,165 B2 | 8/2013 | Yoshida | |
| 8,519,912 B2 | 8/2013 | Tateuchi et al. | |
| 8,927,981 B2 | 1/2015 | Akimoto et al. | |
| 8,980,665 B2 | 3/2015 | Yamazaki et al. | |
| 9,087,489 B2 | 7/2015 | Yamazaki | |
| 9,231,110 B2 | 1/2016 | Yamazaki et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0118697 A1 | 6/2006 | Lee et al. | |
| 2006/0163577 A1 | 7/2006 | Yamazaki et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0229424 A1 | 10/2007 | Hayashi et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0049156 A1 * | 2/2008 | Kim | G02F 1/136286 349/40 |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068074 A1 | 3/2009 | Lai et al. | |
| 2009/0073325 A1 | 3/2009 | Kuwabara et al. | |
| 2009/0114910 A1 | 5/2009 | Chang | |
| 2009/0128043 A1 | 5/2009 | Wang et al. | |
| 2009/0134399 A1 | 5/2009 | Sakakura et al. | |
| 2009/0135318 A1 | 5/2009 | Tateuchi et al. | |
| 2009/0146992 A1 | 6/2009 | Fukunaga et al. | |
| 2009/0152541 A1 | 6/2009 | Maekawa et al. | |
| 2009/0161051 A1 | 6/2009 | Fukunaga et al. | |
| 2009/0278122 A1 | 11/2009 | Hosono et al. | |
| 2009/0280600 A1 | 11/2009 | Hosono et al. | |
| 2009/0321640 A1 * | 12/2009 | Onogi | G01J 1/1626 250/338.1 |
| 2011/0148835 A1 | 6/2011 | Yamazaki | |

(56) References Cited

U.S. PATENT DOCUMENTS

2011/0199738 A1* 8/2011 Moriwaki .............. G02F 1/1345
361/748

FOREIGN PATENT DOCUMENTS

| | | |
|---|---|---|
| EP | 2226847 A | 9/2010 |
| EP | 2339639 A | 6/2011 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-224626 A | 9/1993 |
| JP | 05-251705 A | 9/1993 |
| JP | 05224626 A * | 9/1993 |
| JP | 07-092482 A | 4/1995 |
| JP | 08-264794 A | 10/1996 |
| JP | 11-505377 | 5/1999 |
| JP | 11-355797 A | 12/1999 |
| JP | 2000-044236 A | 2/2000 |
| JP | 2000-112382 A | 4/2000 |
| JP | 2000-150900 A | 5/2000 |
| JP | 2002-076356 A | 3/2002 |
| JP | 2002-289859 A | 10/2002 |
| JP | 2003-029239 A | 1/2003 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2006-086425 A | 3/2006 |
| JP | 2007-094098 A | 4/2007 |
| JP | 2007-103918 A | 4/2007 |
| JP | 2008-182219 A | 8/2008 |
| JP | 2008-235756 A | 10/2008 |
| JP | 2009-128835 A | 6/2009 |
| JP | 2009-135188 A | 6/2009 |
| JP | 2009-140193 A | 6/2009 |
| JP | 2009-151039 A | 7/2009 |
| JP | 2009-258219 A | 11/2009 |
| JP | 2009-282303 A | 12/2009 |
| JP | 2013-200566 A | 10/2013 |
| JP | 5512232 | 6/2014 |
| JP | 5651359 | 1/2015 |
| KR | 2009-0056205 A | 6/2009 |
| KR | 10-1887837 | 8/2018 |
| TW | 200627335 | 8/2006 |
| TW | 200900666 | 1/2009 |
| TW | 200923331 | 6/2009 |
| WO | WO-2001/047033 | 6/2001 |
| WO | WO-2004/114391 | 12/2004 |
| WO | WO-2007/029844 | 3/2007 |
| WO | WO-2011/074394 | 6/2011 |

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.
Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.
Kimizuka.N et al., "Spinel,YBFE2O4, and YB2FE3O7 Types of Structures for Compounds in the In2O3 and SC2O3—A2O3—BO Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.
Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Kitzerow.H et al., "Observation of Blue Phases in Chiral Networks", Liquid Crystals, 1993, vol. 14, No. 3, pp. 911-916.
Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Prins.M et al., "A Ferroelectric Transparent Thin-Film Transistor", Appl. Phys. Lett. (Applied Physics Letters), Jun. 17, 1996, vol. 68, No. 25, pp. 3650-3652.
Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.
Kikuchi.H et al., "Polymer-Stabilized Liquid Crystal Blue Phases", Nature Materials, Sep. 2, 2002, vol. 1, pp. 64-68.
Tsuda.K et al., "Ultra Low Power Consumption Technologies for Mobile TFT-LCDs", IDW '02 : Proceedings of the 9th International Display Workshops, Dec. 4, 2002, pp. 295-298.
Nomura.K et al., "Thin-Film Transistor Fabricated in Single-Crystalline Transparent Oxide Semiconductor", Science, May 23, 2003, vol. 300, No. 5623, pp. 1269-1272.
Ikeda.T et al., "Full-Functional System Liquid Crystal Display Using Cg-Silicon Technology", SID Digest '04 : SID International Symposium Digest of Technical Papers, 2004, vol. 35, pp. 860-863.
Nomura.K et al., "Room-Temperature Fabrication of Transparent Flexible Thin-Film Transistors Using Amorphous Oxide Semiconductors", Nature, Nov. 25, 2004, vol. 432, pp. 488-492.
Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.
Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.
Lee.H et al., "Current Status of, Challenges to, and Perspective View of AM-OLED", IDW '06 : Proceedings of the 13th International Display Workshops, Dec. 7, 2006, pp. 663-666.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.
Park.S et al., "Challenge to Future Displays: Transparent AM-OLED Driven by PEALD Grown ZnO TFT", IMID '07 Digest, 2007, pp. 1249-1252.
Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.
Miyasaka.M, "SUFTLA Flexible Microelectronics on Their Way to Business", SID Digest '07 : SID International Symposium Digest of Technical Papers, 2007, vol. 38, pp. 1673-1676.
Kurokawa.Y et al., "UHF RFCPUS on Flexible and Glass Substrates for Secure RFID Systems", Journal of Solid-State Circuits, 2008, vol. 43, No. 1, pp. 292-299.
Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.
Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

(56) References Cited

OTHER PUBLICATIONS

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Sakata.J et al., "Development of 4.0-In. AMOLED Display With Driver Circuit Using Amorphous In—Ga—Zn—Oxide TFTs", IDW '09 : Proceedings of the 16th International Display Workshops, 2009, pp. 689-692.

Asaoka.Y et al., "29.1: Polarizer-Free Reflective LCD Combined With Ultra Low-Power Driving Technology", SID Digest '09 : SID International Symposium Digest of Technical Papers, May 31, 2009, pp. 395-398.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Jin.D et al., "65.2:Distinguished Paper:World-Largest (6.5") Flexible Full Color Top Emission AMOLED Display on Plastic Film and its Bending Properties"SID Digest '09 : SID International Symposium Digest of Technical Papers, May 31, 2009, pp. 983-985.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Park.J et al., "High performance amorphous oxide thin film transistors with self-aligned top-gate structure", IEDM 09: Technical Digest of International Electron Devices Meeting, Dec. 7, 2009, pp. 191-194.

Nakamura.M, "Synthesis of Homologous Compound with New Long-Period Structure", NIRIM Newsletter, Mar. 1, 1995, vol. 150, pp. 1-4.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Orita.M et al., "Amorphous transparent conductive oxide InGaO3(ZnO)m (m<4):a Zn4s conductor", Philosophical Magazine, 2001, vol. 81, No. 5, pp. 501-515.

Janotti.A et al., "Oxygen Vacancies in ZnO", Appl. Phys. Lett. (Applied Physics Letters) , 2005, vol. 87, pp. 122102-1-122102-3.

Clark.S et al., "First Principles Methods Using CASTEP", Zeitschrift fur Kristallographie, 2005, vol. 220, pp. 567-570.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202.22.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Oba.F et al., "Defect energetics in ZnO: A hybrid Hartree-Fock density functional study", Phys. Rev. B (Physical Review. B), 2008, vol. 77, pp. 245202-1-245202-6.

Kim.S et al., "High-Performance oxide thin film transistors passivated by various gas plasmas", 214th ECS Meeting, 2008, No. 2317, ECS.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Mo.Y et al., "Amorphous Oxide TFT Backplanes for Large Size AMOLED Displays", IDW '08 : Proceedings of the 6th International Display Workshops, Dec. 3, 2008, pp. 581-584.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

(56) References Cited

OTHER PUBLICATIONS

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.
Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.
Ueno.K et al., "Field-Effect Transistor on $SrTiO_3$ With Sputtered $Al_2O_3$ Gate Insulator", Appl. Phys. Lett. (Applied Physics Letters), Sep. 1, 2003, vol. 83, No. 9, pp. 1755-1757.
Nomura.K et al., "Carrier transport in transparent oxide semiconductor with intrinsic structural randomness probed using single-crystalline $InGaO_3(ZnO)_5$ films", Appl. Phys. Lett. (Applied Physics Letter), Sep. 13, 2004, vol. 85, No. 11, pp. 1993-1995.
International Search Report (Application No. PCT/JP2010/071205) dated Dec. 21, 2010.
Written Opinion (Application No. PCT/JP2010/071205) dated Dec. 21, 2010.
Chinese Office Action (Application No. 201080057119.2) dated May 7, 2014.
Taiwanese Office Action (Application No. 099142636) dated Oct. 14, 2015.
Taiwanese Office Action (Application No. 099142636) dated Nov. 10, 2015.
Korean Office Action (Application No. 2017-7013173) dated May 30, 2017.
Korean Office Action (Application No. 2017-7013173) dated Dec. 28, 2017.
Korean Office Action (Application No. 2018-7022437) dated Sep. 18, 2018.

\* cited by examiner

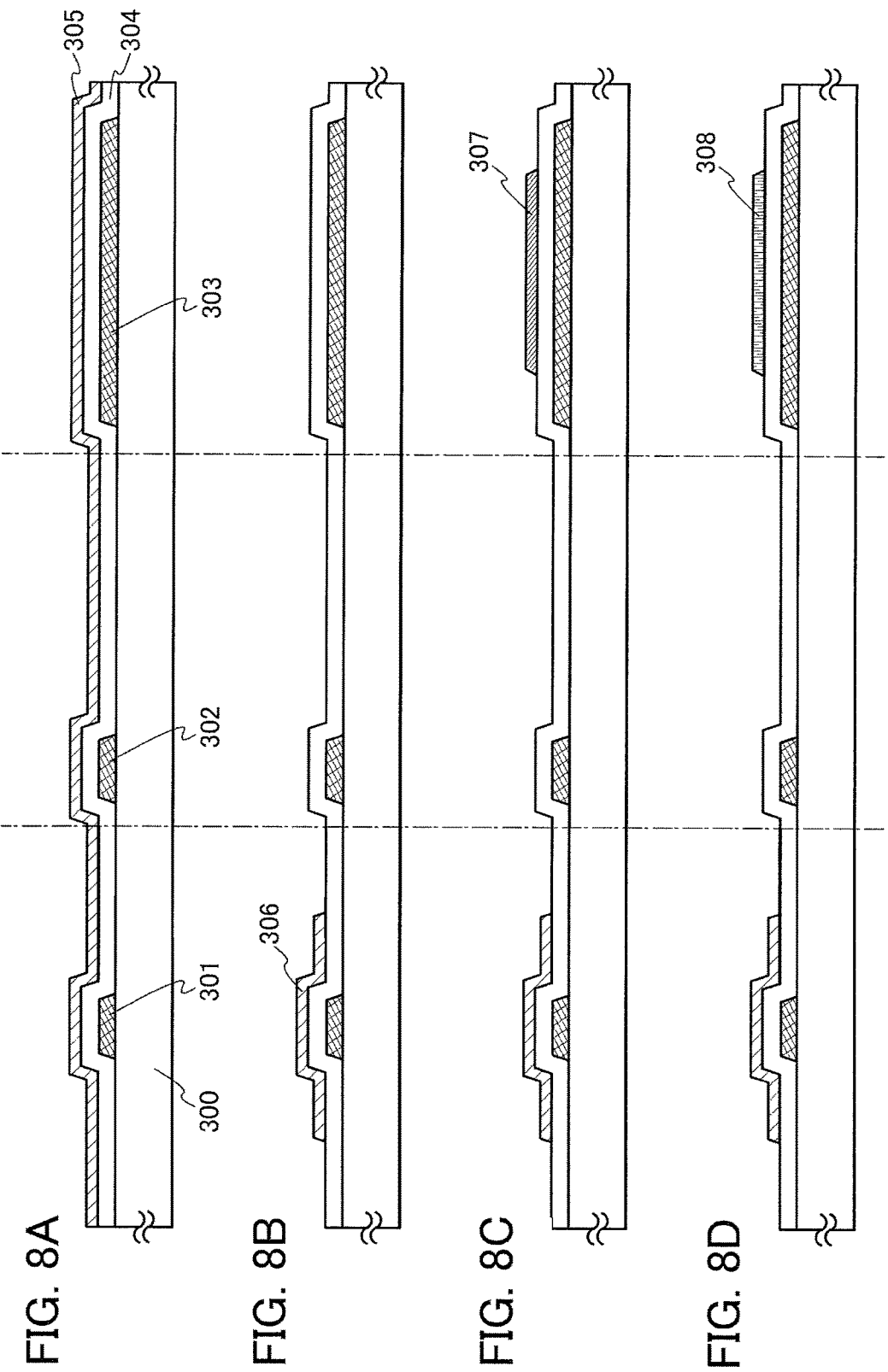

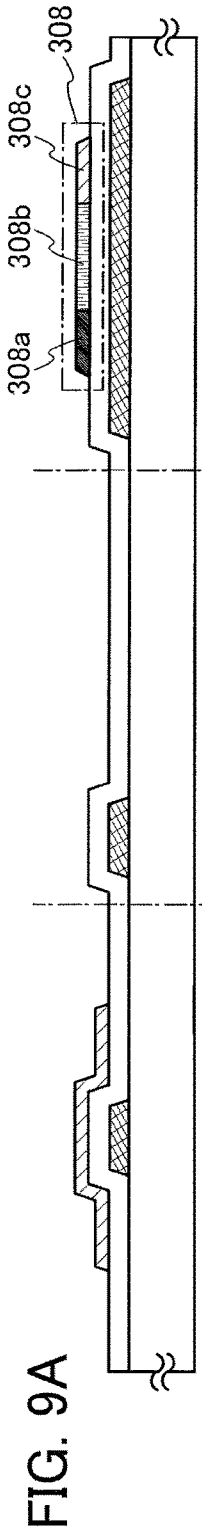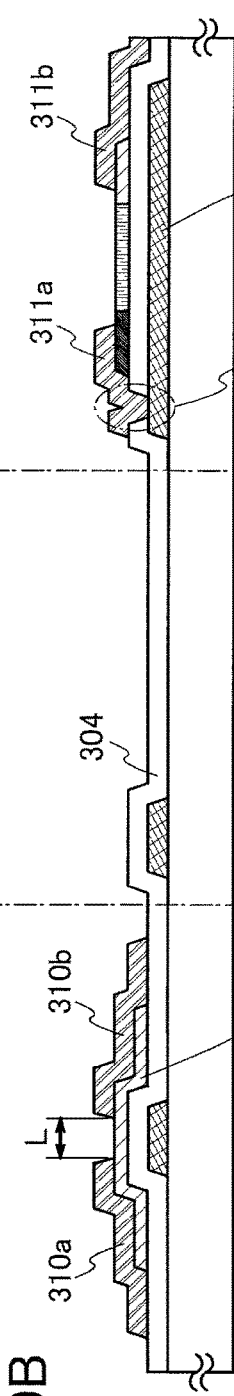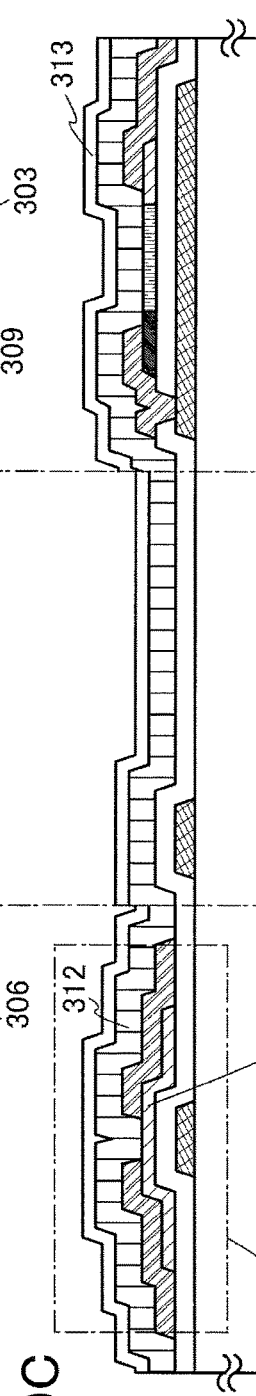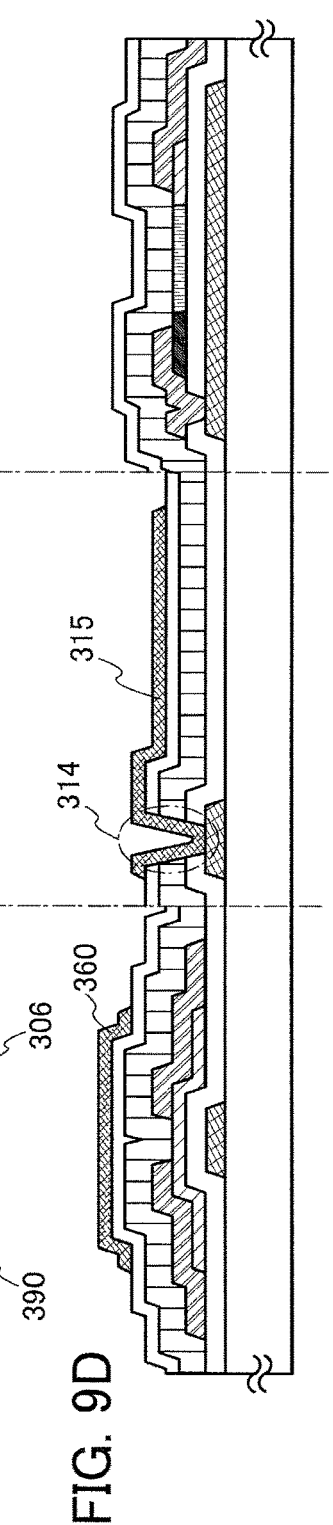

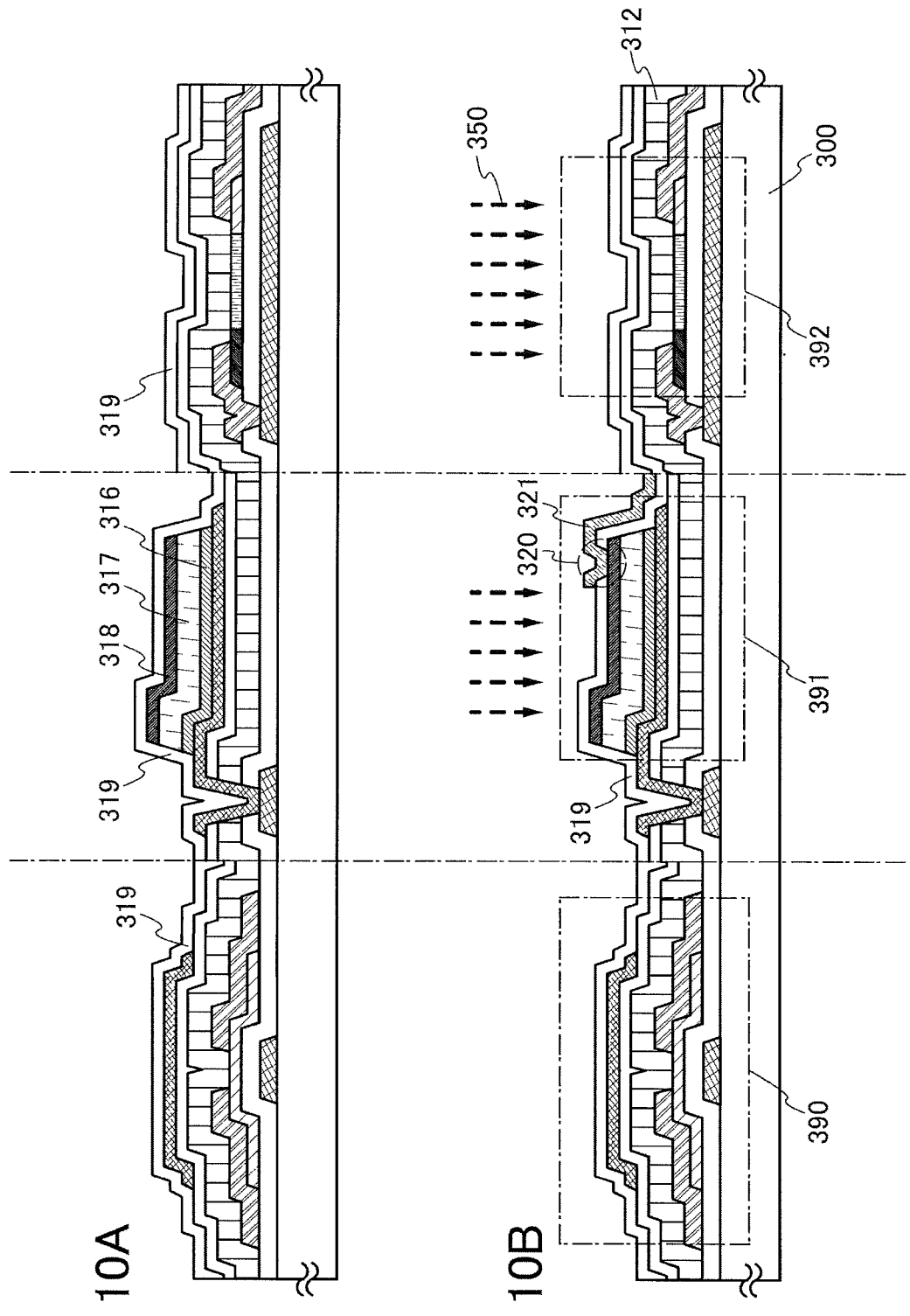

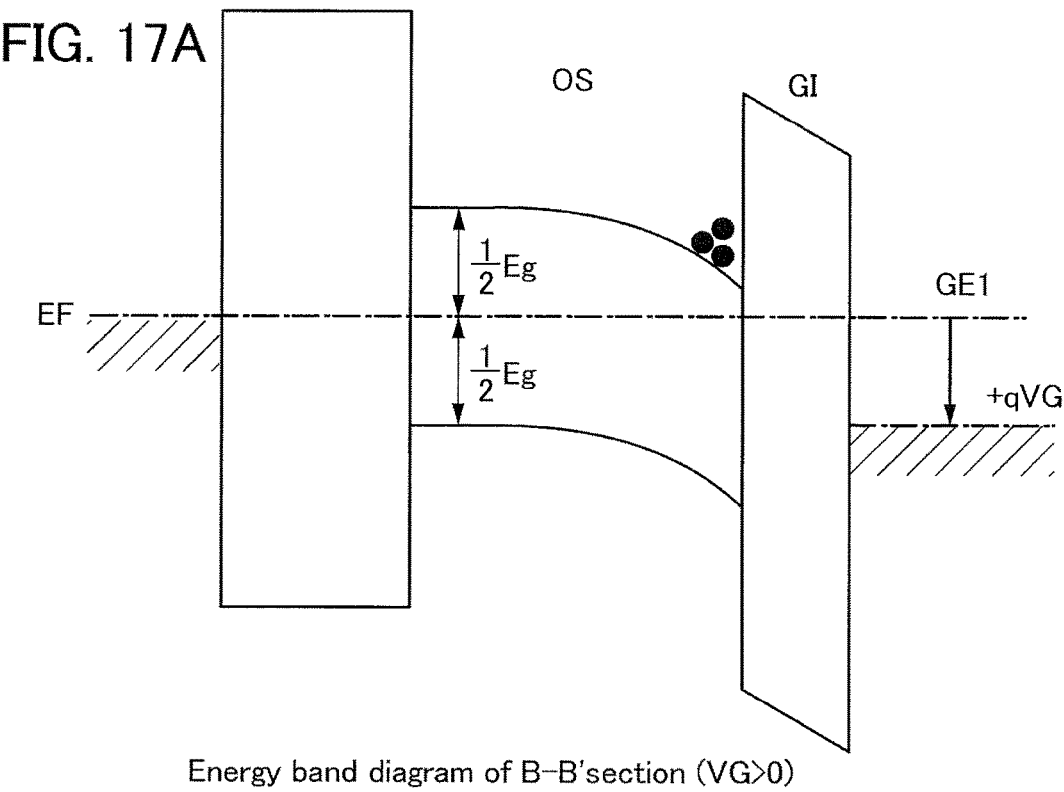
Energy band diagram of B-B' section (VG>0)
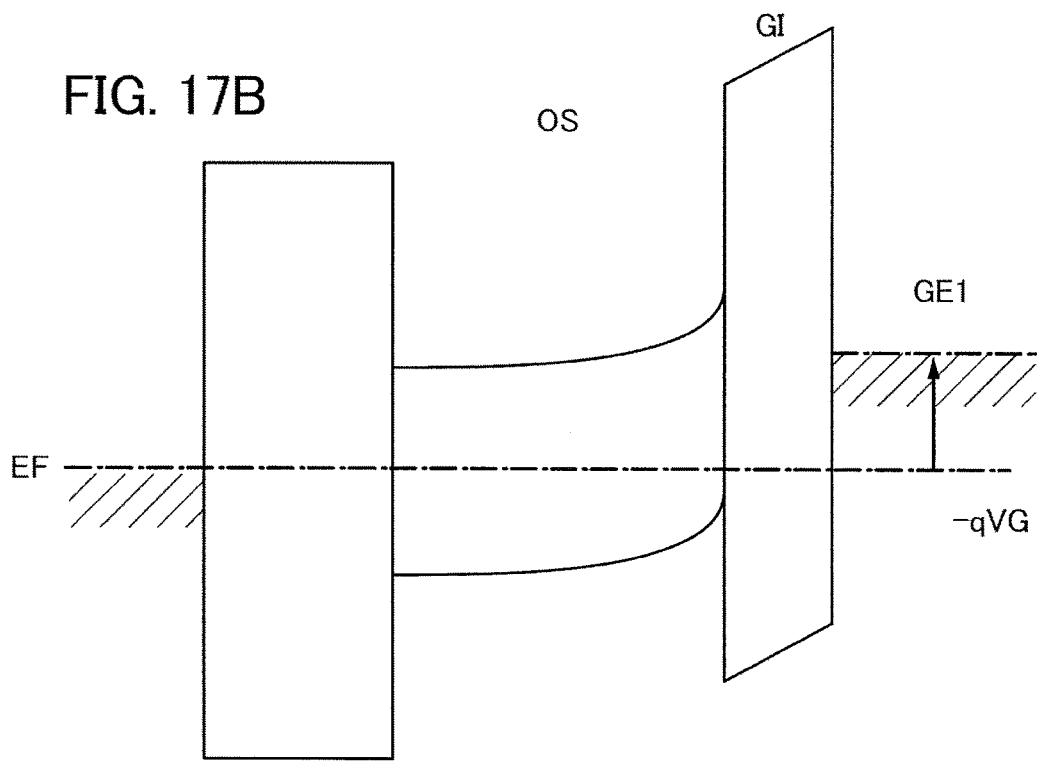
Energy band diagram of B-B' section (VG<0)

DISPLAY DEVICE INCLUDING OPTICAL SENSOR AND DRIVING METHOD THEREOF

CROSS-REFERENCE TO RELATED APPLICATIONS

This application is a divisional of U.S. application Ser. No. 12/964,405, filed Dec. 9, 2010, now allowed, which claims the benefit of a foreign priority application filed in Japan as Serial No. 2009-288511 on Dec. 18, 2009, both of which are incorporated by reference.

TECHNICAL FIELD

An embodiment of the present invention relates to an optical sensor including a thin film semiconductor, and to a display device including the optical sensor.

BACKGROUND ART

In recent years, there has been a trend in active matrix display devices typified by a liquid crystal display device towards a larger screen of a diagonal size of 20 inches or more, and further, the development of an active matrix display device is aimed even at a diagonal screen size of 100 inches or more. In addition, there is a trend toward higher screen resolution, e.g., high-definition (HD) image quality (1366×768) or full high-definition (FHD) image quality (1920×1080), and the development of a so-called 4K Digital Cinema display device, which has a resolution of 3840×2048 or 4096×2180, is also accelerated.

As the screen size or resolution increases, a transistor is required to have higher field effect mobility. In addition, as the screen size increases, not only does power consumption increase, but also display quality such as uneven display or color tones becomes more noticeable by a viewer.

In addition, display quality sensed by a viewer, such as luminance or colors, greatly depends on illuminance or color temperature in an environment where a display device is placed. For example, Patent Document 1 discloses a display device which controls its emission intensity in accordance with the intensity of external light incident on the display device (the illuminance).

In the case where a display device is used not only indoors but also outdoors, there is a large amount of change ranging from low illuminance to high illuminance. Therefore, the output of an optical sensor for low illuminance is saturated at high illuminance, and an optical sensor for high illuminance has difficulty detecting an illuminance at low illuminance. Patent Document 2 discloses a display device which determines whether it is located indoors or outdoors, with the use of an optical sensor having optical sensitivity in a visible light range and an optical sensor having optical sensitivity in an infrared range, whereas it does not disclose an optical sensor capable of providing a stable output in the range of from low illuminance to high illuminance.

REFERENCES

[Patent Document 1] Japanese Published Patent Application No. 2000-112382
[Patent Document 2] Japanese Published Patent Application No. 2003-29239

DISCLOSURE OF INVENTION

An increase in screen size or resolution causes an increase in wiring resistance or parasitic capacitance, which results in a decrease in display quality or an increase in power consumption of a display device. Particularly in an active matrix display device, as the screen size increases, a variation in characteristics such as off-state current or threshold voltage of a transistor included in each pixel more significantly affects power consumption, display quality, or the like.

As the screen size increases, not only does power consumption increase, but also display quality such as uneven display or color tones becomes more noticeable by a viewer. Therefore, it is demanded to suppress a decrease in display quality caused by an ambient environment while suppressing power consumption of a display device by correcting a display image to an appropriate emission intensity or color tone in accordance with illuminance or color temperature in an environment where the display device is placed.

It is an object of one embodiment of the present invention to realize a reduction in power consumption of a display device.

It is another object of one embodiment of the present invention to provide optimum display quality in accordance with an ambient environment.

It is another object of one embodiment of the present invention to provide a transistor which stably operates in the temperature range of approximately from room temperature to 180° C., and a display device including the transistor.

One embodiment of the present invention is a display device which detects an illuminance or a color temperature around the display device by using an amorphous thin film optical sensor having high optical sensitivity to visible light and a polycrystalline thin film optical sensor having lower optical sensitivity to visible light than the amorphous thin film optical sensor but also having optical sensitivity to infrared light, and which adjusts a luminance or a color tone of a display image with the use of detection results.

Another embodiment of the present invention is a display device which detects an illuminance or a color temperature around the display device by using an amorphous thin film optical sensor having high sensitivity to visible light and a polycrystalline thin film optical sensor having lower optical sensitivity to visible light than the amorphous thin film optical sensor but also having optical sensitivity to infrared light, which adjusts a luminance or a color tone of a display image with the use of detection results, and which sets a writing interval to 1 second or longer when displaying a still image.

Another embodiment of the present invention is a display device which includes a first substrate provided with a terminal portion, a pixel electrode, a switching transistor, an amorphous thin film optical sensor having high optical sensitivity to visible light, and a polycrystalline thin film optical sensor having lower optical sensitivity to visible light than the amorphous thin film optical sensor but also having optical sensitivity to infrared light and includes a second substrate provided with a counter electrode. A potential is supplied from the terminal portion to the counter electrode through the switching transistor. An illuminance or a color temperature around the display device is detected using the optical sensors. With the use of detection results, a luminance or a color tone of a display image is adjusted. When a still image is displayed, the switching transistor is turned off such that the potential of the counter electrode is in a floating state.

Another embodiment of the present invention is a display device which includes a first substrate provided with a first optical sensor, a second optical sensor, and a pixel circuit having a plurality of pixels. The first optical sensor includes a first photoelectric conversion element including an amorphous semiconductor and a first amplifier circuit having a transistor including an oxide semiconductor. The second optical sensor includes a second photoelectric conversion element including a polycrystalline semiconductor and a second amplifier circuit having a transistor including an oxide semiconductor. The pixel circuit includes a pixel electrode and a transistor including an oxide semiconductor.

Another embodiment of the present invention is a display device which includes a first substrate and a second substrate facing each other. The first substrate is provided with a terminal portion, a first optical sensor, a second optical sensor, and a pixel circuit having a plurality of pixels. The first optical sensor includes a first photoelectric conversion element including an amorphous semiconductor and a first amplifier circuit having a transistor including an oxide semiconductor. The second optical sensor includes a second photoelectric conversion element including a polycrystalline semiconductor and a second amplifier circuit having a transistor including an oxide semiconductor. The pixel circuit includes a pixel electrode and a transistor including an oxide semiconductor. The second substrate is provided with a counter electrode, and the counter electrode is electrically connected to the terminal portion through the transistor including an oxide semiconductor which is provided over the first substrate.

Another embodiment of the present invention is a display device which includes a first substrate and a second substrate facing each other. The first substrate is provided with a terminal portion, a switching transistor including an oxide semiconductor, a first optical sensor, a second optical sensor, a pixel circuit having a plurality of pixels, and a driver circuit between the pixel circuit and a substrate edge. The first optical sensor includes a first photoelectric conversion element including an amorphous semiconductor and a first amplifier circuit having a transistor including an oxide semiconductor. The second optical sensor includes a second photoelectric conversion element including a polycrystalline semiconductor and a second amplifier circuit having a transistor including an oxide semiconductor. The second substrate is provided with a counter electrode, and the counter electrode is electrically connected to the terminal portion through the switching transistor. A wiring connecting the switching transistor and the terminal portion is formed between the driver circuit and the substrate edge.

Specifically, an oxide semiconductor having a carrier density of less than $1 \times 10^{14}/cm^3$, preferably less than $1 \times 10^{12}/cm^3$, more preferably less than $1 \times 10^{11}/cm^3$ is used.

As the amorphous semiconductor, amorphous silicon can be used. As the polycrystalline semiconductor, polycrystalline silicon or microcrystalline silicon can be used.

In a period for displaying a still image, the supply of a signal from a gate line driver circuit or a signal line driver circuit can be stopped.

In the period for displaying a still image, the switching transistor can be turned off so that the counter electrode is brought into a floating state.

According to one embodiment of the present invention, a display device with low power consumption and good display quality can be provided.

BRIEF DESCRIPTION OF DRAWINGS

FIGS. 8A to 8D illustrate a manufacturing process of a transistor and an optical sensor.
FIGS. 9A to 9D illustrate a manufacturing process of a transistor and an optical sensor.
FIGS. 10A and 10B illustrate a manufacturing process of a transistor and an optical sensor.
FIGS. 17A and 17B are energy band diagrams along a B-B' section in FIG. 15.

BEST MODE FOR CARRYING OUT THE INVENTION

Figure 1A:
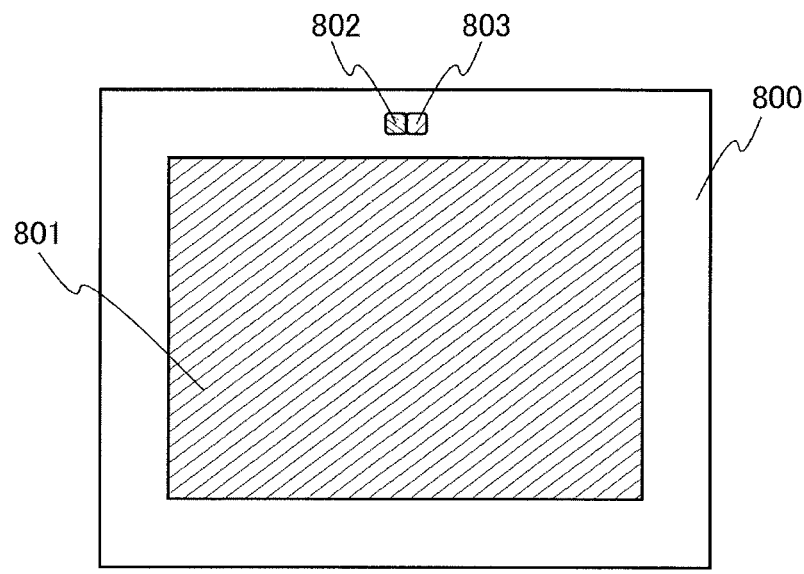
FIGS. 1A and 1B each illustrate a display device.

Embodiments and examples of the present invention will be described below with reference to the accompanying drawings. Note that the present invention can be carried out in many different modes, and it is easily understood by those skilled in the art that modes and details of the present invention can be modified in various ways without departing from the spirit and the scope of the present invention. Therefore, the present invention should not be interpreted as being limited to the description in the embodiments and examples. In the modes of the present invention described below, the same components in different diagrams are commonly denoted by the same reference numerals.

Note that the size, the thickness of a layer, or the region of each component illustrated in the drawings or the like in embodiments may be exaggerated for clarity in some cases. Therefore, embodiments of the present invention are not limited to such scales.

Note that numeral terms such as "first", "second", "third", to "N-th" (N is a natural number) in this specification are used in order to avoid confusion between components, and the terms do not limit the components numerically.

Note that a voltage refers to a potential difference between a given potential and a reference potential (e.g., a ground potential) in many cases. Accordingly, a voltage, a potential, and a potential difference can be referred to as a potential, a voltage, and a voltage difference, respectively.

A transistor is a kind of semiconductor elements and can achieve amplification of a current or a voltage, switching operation for controlling conduction or non-conduction, or the like. A transistor in this specification includes an insulated-gate field effect transistor (IGFET) and a thin film transistor (TFT).

Note that in circuit diagrams in this specification, a transistor including an oxide semiconductor layer is denoted by a symbol "OS" so that it can be identified as a transistors including an oxide semiconductor layer.

Embodiment 1

Figure 1B:
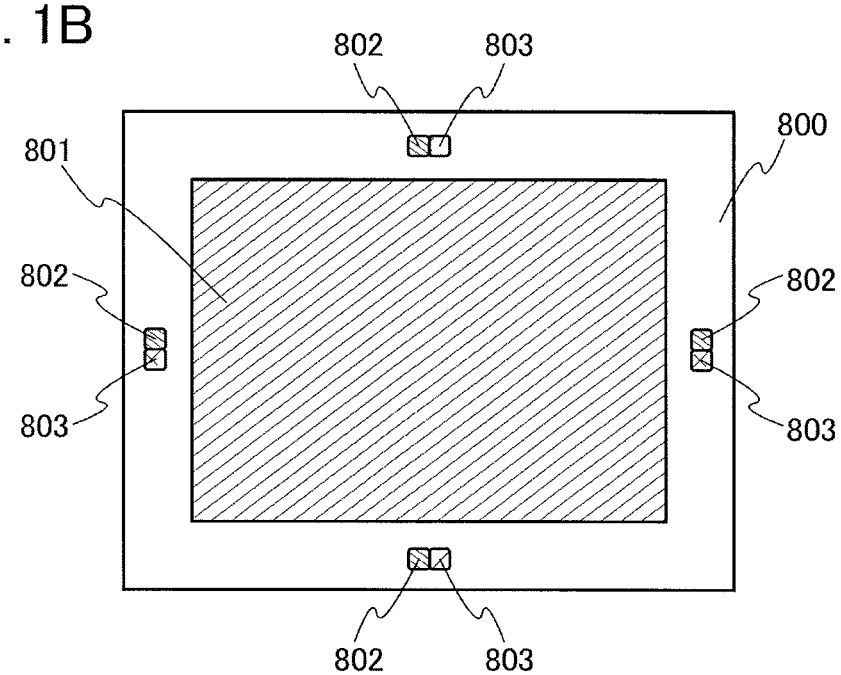

In this embodiment, one embodiment of a display device incorporating an optical sensor will be described. FIGS. 1A and 1B each illustrate a display device 800 incorporating an optical sensor. In FIG. 1A, an optical sensor 802 and an optical sensor 803 are provided in an upper portion outside a display portion 801. In FIG. 1B, a plurality of optical sensors 802 and a plurality of optical sensors 803 are provided around a display portion 801.

In the optical sensor 802, a photoelectric conversion element includes an amorphous semiconductor, and in the optical sensor 803, a photoelectric conversion element includes a polycrystalline semiconductor. The illuminance around the display device is detected by the optical sensor 802 or the optical sensor 803, and the luminance of the display device is adjusted. For example, when the illuminance around the display device is high, the luminance of the display portion 801 is increased, and when the illuminance around the display portion is low, the luminance of the display portion 801 is decreased, whereby a change in luminance sensed by a user can be reduced and an increase in power consumption can be suppressed.

When a plurality of optical sensors 802 and a plurality of optical sensors 803 are provided as illustrated in FIG. 1B, the illuminance around the display device can be detected more accurately. For example, even in the case where some of the optical sensors are covered, the illuminance around the display device can be detected by the other optical sensors.

Figure 2A:
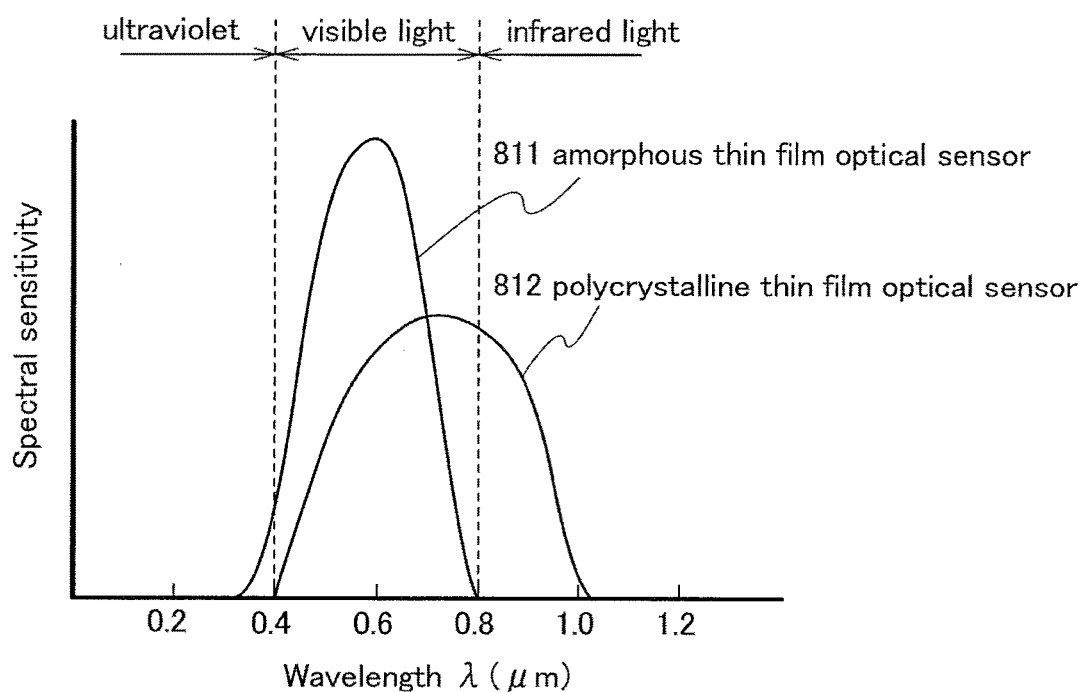
FIGS. 2A and 2B illustrate optical sensitivity characteristics of optical sensors.

FIG. 2A illustrates optical sensitivity characteristics of an optical sensor in which an amorphous silicon thin film is used as an amorphous semiconductor for a photoelectric conversion element (hereinafter referred to as an amorphous thin film optical sensor) and an optical sensor in which a polycrystalline silicon thin film is used as a polycrystalline semiconductor for a photoelectric conversion element (hereinafter referred to as a polycrystalline thin film optical sensor). In FIG. 2A, a characteristic 811 shows an optical sensitivity characteristic of the amorphous thin film optical sensor, and a characteristic 812 shows an optical sensitivity characteristic of the polycrystalline thin film optical sensor.

Both the amorphous thin film optical sensor and the polycrystalline thin film optical sensor have optical sensitivity to visible light having a wavelength of 0.4 µm to 0.8 µm. In addition, the amorphous thin film optical sensor has high optical sensitivity to visible light and has maximum sensitivity at a wavelength of approximately 0.6 µm. The polycrystalline thin film optical sensor has lower optical sensitivity to visible light than the amorphous thin film optical sensor but has maximum sensitivity at a wavelength of approximately 0.7 µm and can also detect infrared light.

Figure 2B:
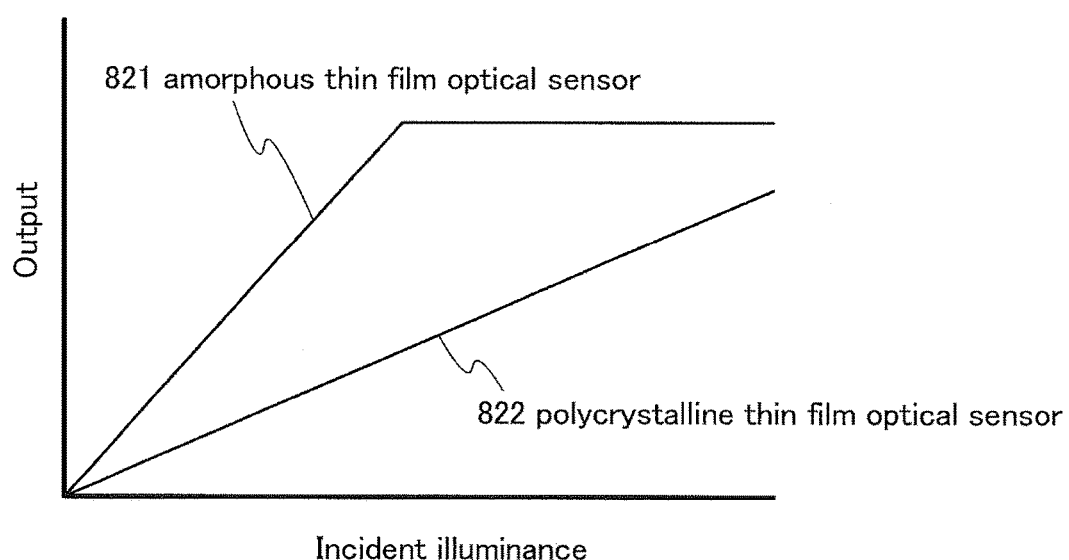

FIG. 2B illustrates the relationship of the output of the optical sensors to incident illuminance. A characteristic 821 shows the relationship between the incident illuminance and the output of the amorphous thin film optical sensor, and a characteristic 822 shows the relationship between the incident illuminance and the output of the polycrystalline thin film optical sensor. The amorphous thin film optical sensor has high optical sensitivity to visible light and therefore can measure illuminance accurately even in a relatively dark environment, whereas in a high illuminance environment such as an outdoor area, its output is saturated and it cannot measure illuminance accurately. On the other hand, the polycrystalline thin film optical sensor has lower optical sensitivity to visible light than the amorphous thin film optical sensor; therefore, even at high incident illuminance, its output is not easily saturated and it can measure illuminance accurately.

With the use of optical sensors having different optical sensitivities to visible light, the brightness around the display device can be detected more accurately, and the luminance of the display device can be optimized.

Figure 3:
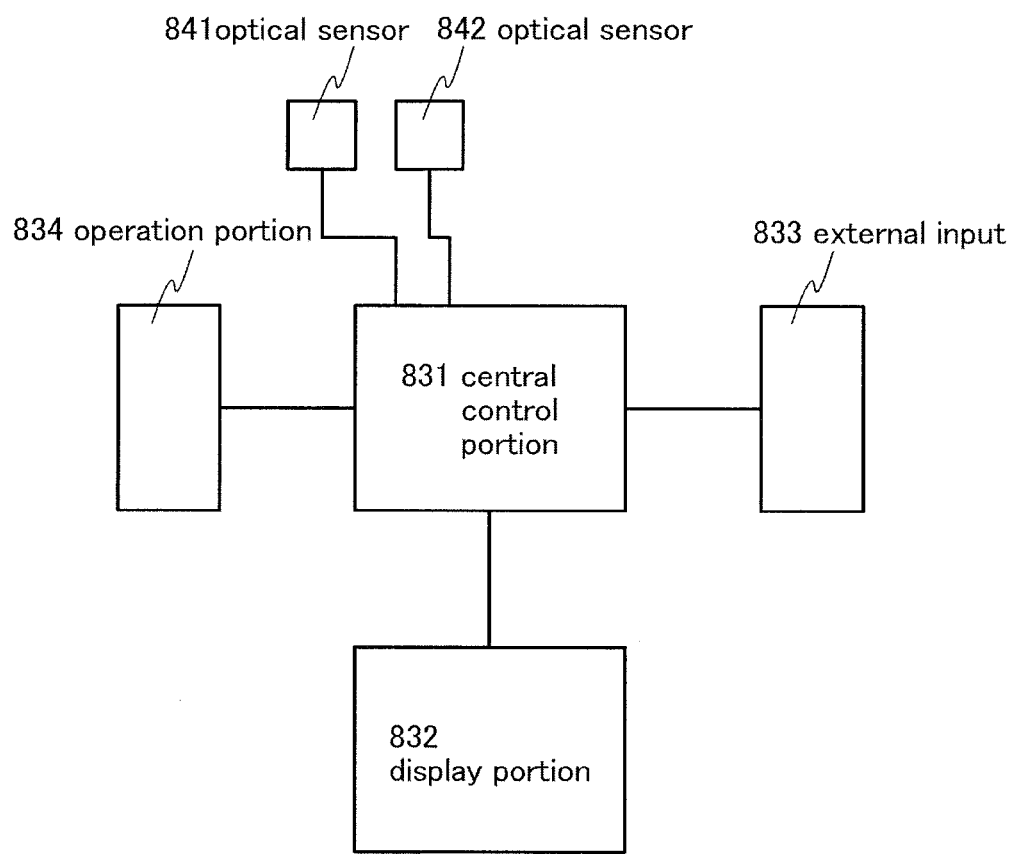
FIG. 3 is a block diagram of a display device.

FIG. 3 is a block diagram of a display device to which this embodiment is applied. A central control portion 831 includes an input/output port, a memory, and the like. An external input 833 is an entrance for a video signal from the outside, and a variety of video signals are input to the central control portion 831 through the external input 833. A user can separately set the luminance, color tone, or the like with an operation portion 834. An optical sensor 841 and an optical sensor 842 have different optical sensitivities to visible light; for example, an amorphous thin film optical sensor is used as the optical sensor 841, and a polycrystalline thin film optical sensor is used as the optical sensor 842.

The central control portion 831 converts a video signal which is input through the external input 833, with the use of the luminance, color tone, or the like which is set with the operation portion 834, in view of the illuminance around the display device which is detected by the optical sensor 841 and the optical sensor 842, and displays an image in a display portion 832.

The central control portion 831 compares signal outputs of both the optical sensor 841 and the optical sensor 842 and corrects the luminance of an image to be displayed in the display portion 832, normally with the use of the output of the optical sensor 841 (the amorphous thin film optical sensor) with high signal intensity. Note that in the case where the signal output is saturated even when the signal intensity is high, the luminance of an image to be displayed in the display portion 832 is corrected with the use of the signal output of the optical sensor 842 (the polycrystalline thin film optical sensor). By thus using the optical sensor 841 and the optical sensor 842 in accordance with the situation, the luminance can be corrected as appropriate even when there is a large amount of change in illuminance around the display device.

In addition, as illustrated in FIG. 2A, the optical sensor 841 which is the amorphous thin film optical sensor does not detect infrared light, whereas the optical sensor 842 which is the polycrystalline thin film optical sensor detects infrared light as well. By utilizing this characteristic difference, a difference between the outputs of both optical sensors is detected using a calculation method stored in the central control portion 831 in advance; accordingly, the infrared light illuminance around the display device can be detected.

For example, the infrared light illuminance is normally higher outdoors than indoors. Therefore, in the case where the infrared light illuminance is high, not only luminance correction based on the visible light illuminance but also color tone correction in view of outdoor use is performed at the same time, whereby display quality can be improved.

As the amorphous thin film optical sensor, a PIN photodiode with an amorphous silicon film can be used, for example. First, a semiconductor layer having p-type conductivity is formed as a first semiconductor layer. Next, a high-resistance semiconductor layer (i-type semiconductor layer) is formed as a second semiconductor layer. Then, a semiconductor layer having n-type conductivity is formed as a third semiconductor layer.

The first semiconductor layer is a p-type semiconductor layer and can be formed using an amorphous silicon film containing an impurity element imparting p-type conductivity. The first semiconductor layer is formed by a plasma CVD method with the use of a semiconductor source gas containing an impurity element belonging to Group 13 (such as boron (B)). As the semiconductor source gas, silane ($SiH_4$) may be used. Alternatively, $Si_2H_6$, $SiH_2Cl_2$, $SiHCl_3$, $SiCl_4$, $SiF_4$, or the like may be used. Alternatively, an amorphous silicon film which does not contain an impurity element may be formed, and then, an impurity element may be introduced into the amorphous silicon film by a diffusion method or an ion implantation method. After the impurity element is introduced by an ion implantation method or the like, heating or the like may be conducted in order to diffuse the impurity element. In this case, as a method for forming the amorphous silicon film, an LPCVD method, a vapor deposition method, a sputtering method, or the like may be used. The first semiconductor layer is preferably formed so as to have a thickness of 10 nm to 50 nm.

The second semiconductor layer is an i-type semiconductor layer (intrinsic semiconductor layer) and is formed with an amorphous silicon film. As the second semiconductor layer, an amorphous silicon film is formed by a plasma CVD method with use of a semiconductor source gas. As the semiconductor source gas, silane ($SiH_4$) may be used. Alternatively, $Si_2H_6$, $SiH_2Cl_2$, $SiHCl_3$, $SiCl_4$, $SiF_4$, or the like may be used. The second semiconductor layer may be alternatively formed by an LPCVD method, a vapor deposition method, a sputtering method, or the like. The second semiconductor layer is preferably formed so as to have a thickness of 200 nm to 1000 nm.

The third semiconductor layer is an n-type semiconductor layer and is formed with an amorphous silicon film containing an impurity element imparting n-type conductivity. The third semiconductor layer is formed by a plasma CVD method with the use of a semiconductor source gas containing an impurity element belonging to Group 15 (such as phosphorus (P)). As the semiconductor source gas, silane ($SiH_4$) may be used. Alternatively, $Si_2H_6$, $SiH_2Cl_2$, $SiHCl_3$, $SiCl_4$, $SiF_4$, or the like may be used. Alternatively, an amorphous silicon film which does not contain an impurity element may be formed, and then, an impurity element may be introduced into the amorphous silicon film by a diffusion method or an ion implantation method. After the impurity element is introduced by an ion implantation method or the like, heating or the like may be performed in order to diffuse the impurity element. In this case, as a method for forming the amorphous silicon film, an LPCVD method, a vapor deposition method, a sputtering method, or the like may be used. The third semiconductor layer is preferably formed so as to have a thickness of 20 nm to 200 nm.

With the use of a polycrystalline semiconductor or a microcrystalline semiconductor instead of an amorphous semiconductor for the first semiconductor layer, the second semiconductor layer, and the third semiconductor layer, a polycrystalline thin film optical sensor can be formed. Alternatively, only the second semiconductor layer may be formed with a polycrystalline semiconductor or a microcrystalline semiconductor.

The microcrystalline semiconductor belongs to a meta-stable state which is an intermediate state between an amorphous state and a single crystal state according to Gibbs free energy. That is, the microcrystalline semiconductor is a semiconductor having a third state which is stable in terms of free energy and has a short range order and lattice distortion. In the microcrystalline semiconductor, columnar or needle-like crystals grow in a normal direction with respect to a surface of a substrate. The Raman spectrum of microcrystalline silicon, which is a typical example of the microcrystalline semiconductor, is shifted to a smaller wave-number region than 520 $cm^{-1}$ which represents single crystal silicon. That is, the peak of the Raman spectrum of microcrystalline silicon exists between 520 $cm^{-1}$ which represents single crystal silicon and 480 $cm^{-1}$ which represents amorphous silicon. The microcrystalline semiconductor includes at least 1 at. % of hydrogen or halogen to terminate a dangling bond. Moreover, a rare gas element such as helium, argon, krypton, or neon may be included to further promote lattice distortion, so that a favorable microcrystalline semiconductor film with enhanced stability can be obtained.

This microcrystalline semiconductor film can be formed by a high-frequency plasma CVD method with a frequency of several tens to several hundreds of megahertz or a microwave plasma CVD method with a frequency of 1 GHz or more. Typically, the microcrystalline semiconductor film can be formed by using a gas obtained by diluting a silicon hydride, such as $SiH_4$, $Si_2H_6$, $SiH_2Cl_2$, $SiHCl_3$, $SiCl_4$, or $SiF_4$, with hydrogen. Alternatively, the microcrystalline semiconductor film can be formed by using a gas including a silicon hydride and hydrogen which is diluted with one or more rare gas elements selected from helium, argon, krypton, and neon. In this case, the flow rate of hydrogen is set 5 times to 200 times, preferably 50 times to 150 times, more preferably 100 times, as high as that of a silicon hydride. Furthermore, a gas including silicon may be mixed with a carbide gas such as $CH_4$ or $C_2H_6$, a germanium gas such as $GeH_4$ or $GeF_4$, $F_2$, or the like.

In addition, the mobility of holes generated by the photoelectric effect is lower than the mobility of electrons. Therefore, in the case of a PIN photodiode formed by stacking semiconductor layers, the p-type semiconductor layer side may be used as a light-receiving plane.

In this manner, with the use of the amorphous thin film optical sensor and the polycrystalline thin film optical sensor which have different optical sensitivities to visible light, the ambient illuminance is accurately detected and the luminance of the display device is optimized, whereby a change in luminance sensed by a user can be reduced and an increase in power consumption can be suppressed. In addition, with a difference between the outputs of the amorphous thin film optical sensor and the polycrystalline thin film optical sensor, the infrared light illuminance is detected and the color tone of the display portion is corrected, whereby display quality can be improved.

Embodiment 2

In this embodiment, an embodiment of a display device incorporating an optical sensor, which is different from Embodiment 1, will be described.

In this embodiment, as an example of a display device, a liquid crystal display device will be described with reference to FIG. 4. A display device 220 includes a pixel circuit 221, a display element control circuit 222, and an optical sensor control circuit 223. The pixel circuit 221 has a plurality of pixels 224 arranged in matrix. Each of the pixels 224 includes a display element 225 and an optical sensor 226 or an optical sensor 236.

The optical sensor 226 is the amorphous thin film optical sensor described in Embodiment 1, and the optical sensor 236 is the polycrystalline thin film optical sensor. FIG. 4 illustrates an example where columns of pixels each including the optical sensor 226 and columns of pixels each including the optical sensor 236 are alternately arranged one by one; however, this embodiment is not particularly limited thereto. For example, the optical sensor 226 or the optical sensor 236 does not necessarily need to be provided in every pixel, and may be provided in every other pixel or every few pixels.

The display element 225 includes a transistor, a storage capacitor, a liquid crystal element including a liquid crystal layer, and the like. The transistor has the function of controlling injection or discharge of charges to/from the storage capacitor. The storage capacitor has the function of holding charges which correspond to a voltage applied to the liquid crystal layer. Taking advantage of a phenomenon in which the direction of polarization changes by application of a voltage to the liquid crystal layer, contrast (grayscale) of light transmitted through the liquid crystal layer is produced; in this manner, image display is realized. Liquid crystal display devices include a transmissive liquid crystal display device which includes a light source (a backlight) on the back side of the liquid crystal layer and displays an image with light transmitted through the liquid crystal layer from the light source, and a reflective liquid crystal display device which displays an image by reflection of external light or light from a light source (front light) provided on the front side of the liquid crystal layer.

Note that methods for displaying color images include a method in which a color filter is used, that is, a color filter method. This method makes it possible to produce the grayscale of a particular color (e.g., red (R), green (G), or blue (B)) when light that has passed through the liquid crystal layer passes through a color filter. Here, when the color filter method is employed, the pixel 224 that has the function of emitting red (R) light, the pixel 224 that has the function of emitting green (G) light, and the pixel 224 that has the function of emitting blue (B) light are called an R pixel, a G pixel, and a B pixel, respectively. Note that a color filter does not necessarily need to be used in the case where only monochrome display is performed.

Methods for displaying color images also include a method in which light sources of particular colors (e.g., red (R), green (G), and blue (B)) are used as a backlight, and are sequentially lit, that is, a field-sequential method. In the field-sequential method, the grayscale of each of the colors can be produced by making the contrast of light transmitted through the liquid crystal layer while the light source thereof is turned on.

Note that although the case where the display element 225 includes a liquid crystal element is described above, the display element 225 may include another element such as a light emitting element. The light emitting element is an element whose luminance is controlled by current or voltage. Specifically, a light emitting diode, an EL element (an organic EL element (an organic light emitting diode (OLED)) or an inorganic EL element), and the like are given.

Each of the optical sensors 226 and 236 described in this embodiment includes an element having the function of generating an electrical signal by receiving light (a photoelectric conversion element), such as a photodiode, and a transistor.

The display element control circuit 222 controls the display elements 225 and includes a display element driver circuit 227 which inputs a signal to the display elements 225 through signal lines (also referred to as "source signal lines") such as video data signal lines, and a display element driver circuit 228 which inputs a signal to the display elements 225 through scan lines (also referred to as "gate signal lines"). For example, the display element driver circuit 228 has the function of selecting the display elements 225 included in the pixels placed in a particular row. The display element driver circuit 227 has the function of applying a given potential to the display elements 225 included in the pixels placed in a selected row. Note that in the display element to which a high potential is applied by the display element driver circuit 228, the transistor is turned on, so that the display element is supplied with a potential which is applied by the display element driver circuit 227.

The optical sensor control circuit 223 controls the optical sensors 226 and includes an optical sensor reading circuit 229 for an optical sensor output signal line, an optical sensor reference signal line, and the like and an optical sensor driver circuit 230. The optical sensor driver circuit 230 has the function of performing reset operation and selecting operation, which are described below, on the optical sensors 226 included in pixels in a particular row. The optical sensor reading circuit 229 has the function of taking out an output signal of the optical sensors 226 included in pixels in a selected row. Note that the optical sensor reading circuit 229 may have a configuration in which an output, which is an analog signal, of the optical sensor is taken out as an analog signal to the outside of the display device by using an OP amplifier or a configuration in which the output is converted into a digital signal by an A/D converter circuit and then taken out to the outside of the display device.

The display device 220 including optical sensors is provided with a circuit having a transistor including an oxide semiconductor.

In order to prevent variation in electrical characteristics of the transistor including an oxide semiconductor layer which is provided in the display device 220 including optical sensors, the oxide semiconductor layer is purified to be electrically i-type (intrinsic) by intentionally removing an impurity such as hydrogen, moisture, a hydroxyl group, or hydride (also referred to as a hydrogen compound) which causes the variation from the oxide semiconductor layer, and additionally, by supplying oxygen which is a main component of an oxide semiconductor and is simultaneously reduced in the step of removing the impurity.

Therefore, it is preferable that the oxide semiconductor contains hydrogen and carriers as little as possible. In the transistor disclosed in this specification, a channel formation region is formed with an oxide semiconductor which contains hydrogen at $5\times10^{19}/cm^3$ or less, preferably $5\times10^{18}/cm^3$ or less, more preferably $5\times10^{17}/cm^3$ or less or less than $1\times10^{16}/cm^3$ and has a carrier density of less than $1\times10^{14}/cm^3$, preferably less than $1\times10^{12}/cm^3$, more preferably less than $1\times10^{11}/cm^3$ with hydrogen removed from the oxide semiconductor to be as close to zero as possible.

Because the transistor including an oxide semiconductor has extremely few carriers (close to zero) in the oxide semiconductor, the off-state current of the transistor can be decreased. It is preferable that the off-state current of the transistor be as small as possible. The off-state current is a current that flows between a source and a drain of a transistor in the case where a given gate voltage of −1 V to −10 V is applied. The current value per micrometer of channel width (W) of the transistor including an oxide semiconductor, which is disclosed in this specification, is 10 aA/μm or less, preferably 1 aA/μm or less, more preferably 1 zA/μm or less. Furthermore, because there is no PN junction and no hot carrier degradation, electrical characteristics of the transistor are not adversely affected thereby.

An example of a circuit diagram of the pixel 224 is described with reference to FIG. 5. The pixel 224 includes the display element 225 including a transistor 201, a storage capacitor 202, and a liquid crystal element 203 and the optical sensor 226 or the optical sensor 236 including a photodiode 204, a transistor 205, and a transistor 206.

A gate of the transistor 201 is electrically connected to a gate signal line 207. One of a source and a drain of the transistor 201 is electrically connected to a video data signal line 210. The other of the source and the drain of the transistor 201 is electrically connected to one electrode of the storage capacitor 202 and one electrode of the liquid crystal element 203. The other electrode of the storage capacitor 202 and the other electrode of the liquid crystal element 203 are each held at a certain potential. The liquid crystal element 203 includes a pair of electrodes and a liquid crystal layer between the pair of electrodes.

When "H" is applied to the gate signal line 207, the transistor 201 supplies the potential of the video data signal line 210 to the storage capacitor 202 and the liquid crystal element 203. The storage capacitor 202 holds the potential supplied. The liquid crystal element 203 changes light transmittance in accordance with the potential supplied.

Because the off-state currents of the transistors 201, 205, and 206, each of which is a transistor including an oxide semiconductor, are extremely small, the storage capacitor can be extremely small or is not necessarily provided.

The photodiode 204 is formed with an amorphous semiconductor, a polycrystalline semiconductor, or a microcrystalline semiconductor. One electrode of the photodiode 204 is electrically connected to a photodiode reset signal line 208, and the other electrode of the photodiode 204 is electrically connected to a gate of the transistor 205 through a gate signal line 213. One of a source and a drain of the transistor 205 is electrically connected to an optical sensor reference signal line 212, and the other of the source and the drain of the transistor 205 is electrically connected to one of a source and a drain of the transistor 206. A gate of the transistor 206 is electrically connected to a gate signal line 209, and the other of the source and the drain of the transistor 206 is electrically connected to an optical sensor output signal line 211.

Figure 5:
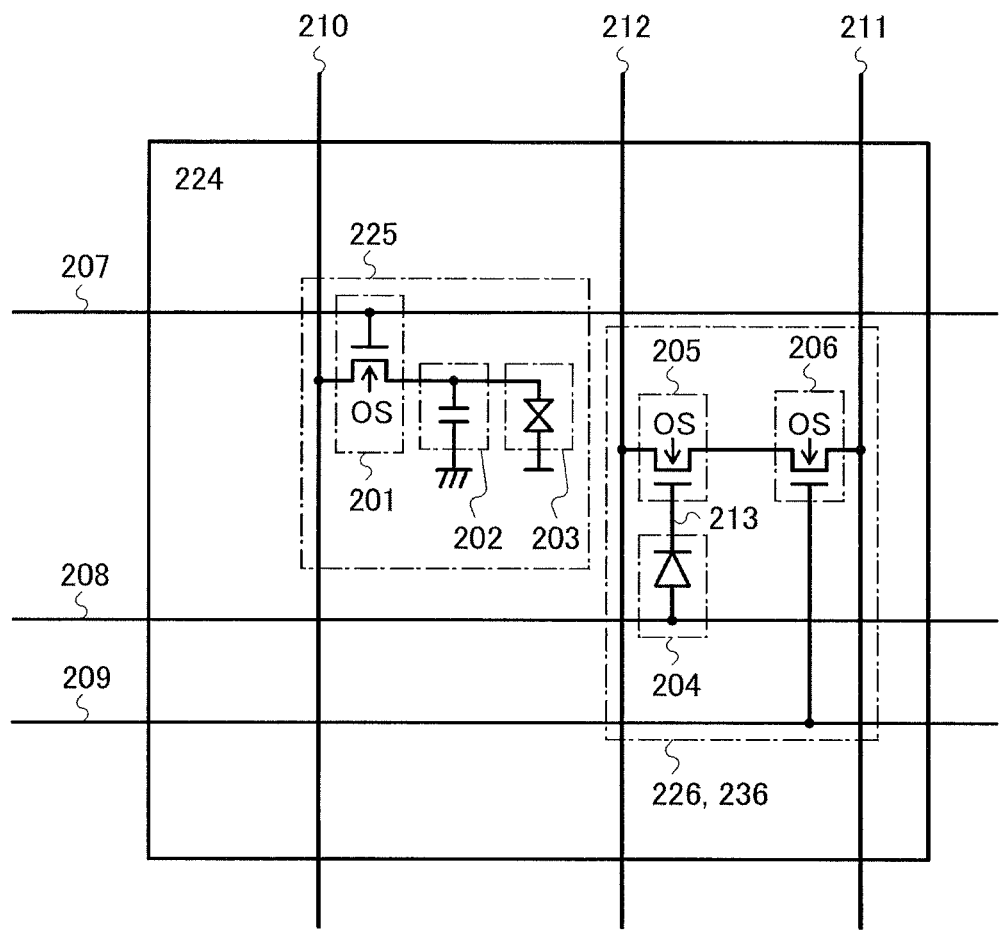
FIG. 5 illustrates a structure of a pixel circuit of a display device.

Note that the arrangement of the transistor 205 and the transistor 206 is not limited to the structure in FIG. 5. For example, a structure may be employed, in which one of the source and the drain of the transistor 206 is electrically connected to the optical sensor reference signal line 212, the other of the source and the drain of the transistor 206 is electrically connected to one of the source and the drain of the transistor 205, the gate of the transistor 205 is electrically connected to the gate signal line 209, and the other of the source and the drain of the transistor 205 is electrically connected to the optical sensor output signal line 211.

Figure 6:
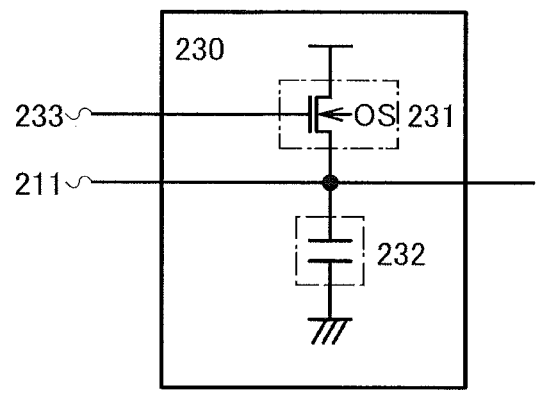
FIG. 6 illustrates a structure of an optical sensor reading circuit.

Next, an example of a structure of the optical sensor reading circuit 229 is described with reference to FIG. 6. In FIG. 6, the optical sensor driver circuit 230 which corresponds to one column of pixels and is included in the optical sensor reading circuit 229 includes a transistor 231 and a storage capacitor 232. In addition, the reference numeral 211 denotes the optical sensor output signal line which corresponds to the column of pixels, and the reference numeral 233 denotes a precharge signal line.

The transistor 205 and the transistor 206 in FIG. 5 and the transistor 231 in FIG. 6 are transistors each including an oxide semiconductor layer.

Figure 4:
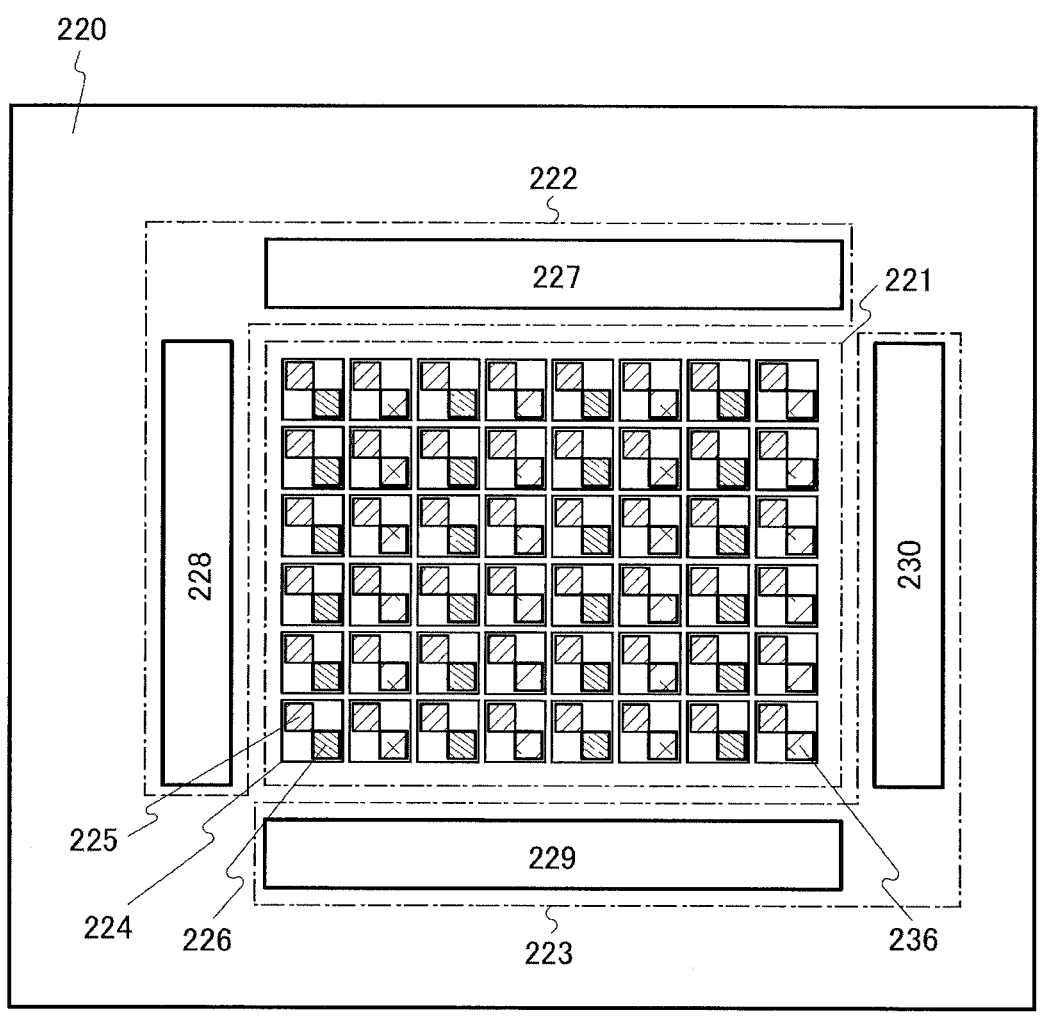
FIG. 4 illustrates a structure of a display device.

In the optical sensor driver circuit 230 which corresponds to one column of pixels and is included in the optical sensor reading circuit 229 illustrated in FIG. 4, the potential of the optical sensor output signal line 211 is set to a reference potential before operation of the optical sensor included in the pixel. The reference potential set for the optical sensor output signal line 211 may be a high potential or a low potential. In FIG. 6, by setting the potential of the precharge signal line 233 to "H", the potential of the optical sensor output signal line 211 can be set to a high potential which is a reference potential. Note that the storage capacitor 232 is not necessarily provided in the case where the parasitic capacitance of the optical sensor output signal line 211 is large.

Figure 7:
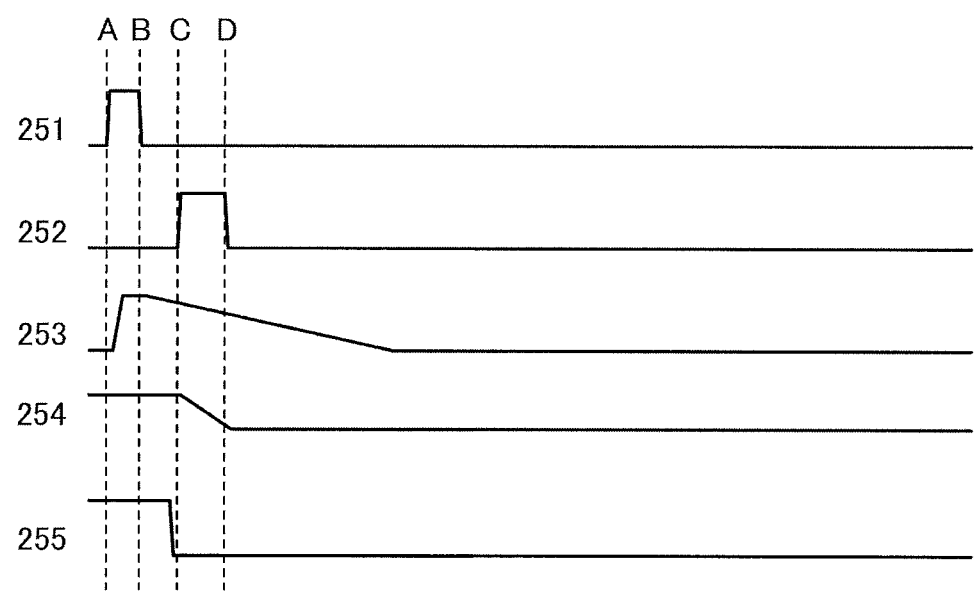
FIG. 7 is a timing chart illustrating reading operation of an optical sensor.

Next, an example of reading operation of the optical sensor in the display device is described with reference to a timing chart of FIG. 7. In FIG. 7, a signal 251, a signal 252, a signal 253, and a signal 254 respectively correspond to the potential of the photodiode reset signal line 208, the potential of the gate signal line 209 to which the gate of the transistor 206 is connected, the potential of the gate signal line 213 to which the gate of the transistor 205 is connected, and the potential of the optical sensor output signal line 211 in FIG. 5. In addition, a signal 255 corresponds to the potential of the precharge signal line 233 in FIG. 6.

At a time "A", when the potential of the photodiode reset signal line 208 (the signal 251) is set to "H" (reset operation), the photodiode 204 is turned on and the potential of the gate signal line 213 to which the gate of the transistor 205 is connected (the signal 253) becomes "H". In addition, when the potential of the precharge signal line 233 (the signal 255) is set to "H", the potential of the optical sensor output signal line 211 (the signal 254) is precharged to "H".

At a time "B", when the potential of the photodiode reset signal line 208 (the signal 251) is set to "L" (accumulating operation), the potential of the gate signal line 213 to which the gate of the transistor 205 is connected (the signal 253) starts to decrease due to the photocurrent of the photodiode 204. The photocurrent of the photodiode 204 increases when the photodiode 204 is irradiated with light; therefore, the potential of the gate signal line 213 to which the gate of the transistor 205 is connected (the signal 253) changes in accordance with the amount of irradiation light. That is, a current between the source and the drain of the transistor 205 changes.

At a time "C", when the potential of the gate signal line 209 (the signal 252) is set to "H" (selecting operation), the transistor 206 is turned on and the optical sensor reference signal line 212 and the optical sensor output signal line 211 are electrically connected to each other through the transistor 205 and the transistor 206. Then, the potential of the optical sensor output signal line 211 (the signal 254) is lowered. Note that before the time "C", the potential of the precharge signal line 233 (the signal 255) is set to "L" and precharge of the optical sensor output signal line 211 is completed. Here, the time it takes for the potential of the optical sensor output signal line 211 (the signal 254) to reach a specific potential (the rate of potential change) depends on the current between the source and the drain of the transistor 205. That is, the time changes in accordance with the amount of light with which the photodiode 204 is irradiated.

At a time "D", when the potential of the gate signal line 209 (the signal 252) is set to "L", the transistor 206 is turned off and the potential of the optical sensor output signal line 211 (the signal 254) has a constant value after the time "D". Here, the potential as the constant value changes in accordance with the amount of light with which the photodiode 204 is irradiated. Therefore, the amount of light with which the photodiode 204 is irradiated can be found by obtaining the potential of the optical sensor output signal line 211.

As described above, operation of individual optical sensors is realized by repeating reset operation, accumulating operation, and selecting operation. In order to realize high-speed imaging in the display device, it is necessary to perform the reset operation, the accumulating operation, and the selecting operation of all the pixels at high speed. If the off-state leakage current of the transistor 206 in FIG. 5 is large, leakage current flows from the optical sensor output signal line 211 to the optical sensor reference signal line 212 through the transistor 205. Then, malfunctions of optical sensor operation could possibly be caused; for example, the gate voltage of the transistor 205 does not reach a desired voltage during reset operation, or the potential of the optical sensor output signal line 211 and the potential of the optical sensor reference signal line 212 become unstable.

However, in the invention disclosed in this specification, a transistor including an oxide semiconductor is formed as the transistor 206 and thus the off-state current thereof is extremely small; therefore, the above malfunctions can be reduced.

In this embodiment, the optical sensors are provided not outside the display portion but inside the display portion, which enables more accurate luminance or color tone correction. In addition, when optical sensors are provided inside the display portion, there is an extremely low possibility that the optical sensors are covered.

In addition, when a color filter is provided over the optical sensors included in the pixels, the illuminance around the display device can be detected through separation of light into color components of RGB. By detection of the illuminance around the display device through separation of light into RGB, the color temperature or chromaticity distribution around the display device can be detected more accurately, and the color tone of a display image can be precisely corrected.

Embodiment 3

In this embodiment, an example of a manufacturing process of the transistor and the optical sensor described in Embodiments 1 and 2 will be described with reference to cross-sectional views of FIGS. 8A to 8D, FIGS. 9A to 9D, FIGS. 10A and 10B, and FIG. 11. A transistor 390 illustrated in FIG. 10B is one type of bottom-gate structures and is also referred to as an inverted-staggered transistor or a channel-etched transistor. An optical sensor 391 is an amorphous thin film optical sensor and includes a PIN photodiode in which a P layer, an I layer, and an N layer formed with amorphous silicon are stacked. An optical sensor 392 is a polycrystalline thin film optical sensor and includes a PIN photodiode in which a P layer, an I layer, and an N layer are formed in one polycrystalline silicon or microcrystalline silicon layer as a photoelectric conversion element. Note that the optical sensor 391 and the optical sensor 392 are designed to detect not light incident from the substrate side but external light 350 incident from an insulating layer 312 side.

Note that a cross-sectional structure of a photodiode which corresponds to a photoelectric conversion element portion of each of the optical sensor 391 and the optical sensor 392 is illustrated in this embodiment. A transistor portion of the optical sensor can be manufactured in a manner similar to that of the transistor 390.

In the following description, the transistor 390 is a transistor having a single-gate structure, but may be a transistor having a multi-gate structure with a plurality of channel formation regions, as needed.

A process of manufacturing the transistor 390 over a substrate 300 will be described below with reference to FIGS. 8A to 8D, FIGS. 9A to 9D, and FIGS. 10A and 10B.

First, a conductive layer is formed over the substrate 300 having an insulating surface, and then, a gate electrode layer 301, a wiring layer 302, and a wiring layer 303 are formed in a first photolithography step. The gate electrode layer and the wiring layers preferably have tapered end portions because coverage with a gate insulating layer to be stacked thereover can be improved. Note that a resist mask may be formed by an inkjet method. Formation of the resist mask by an inkjet method needs no photomask; thus, manufacturing cost can be reduced.

As the substrate 300, a glass substrate, a ceramic substrate, a quartz substrate, a sapphire substrate, a plastic substrate that has heat resistance high enough to withstand a treatment temperature in this manufacturing process, or the like can be used. In the case where the substrate does not need to have a light-transmitting property, a metal substrate, such as a stainless steel alloy substrate, provided with an insulating film over its surface may be used. Alternatively, crystallized glass or the like may be used.

As the glass substrate, in the case where the temperature of heat treatment to be performed later is high, a glass substrate having a strain point of 730° C. or higher is preferably used. As the glass substrate, for example, an alkali-free glass substrate of barium borosilicate glass, aluminoborosilicate glass, aluminosilicate glass, or the like may be used. Note that by containing a larger amount of barium oxide (BaO) than boron oxide ($B_2O_3$), a more practical heat-resistant glass substrate can be obtained. Therefore, a glass substrate containing BaO and $B_2O_3$ so that the amount of BaO is larger than that of $B_2O_3$ is preferably used.

Furthermore, as the substrate 300, a glass substrate in any of the following sizes can be used: the 3rd generation (550 mm×650 mm), the 3.5th generation (600 mm×720 mm, or 620 mm×750 mm), the 4th generation (680×880 mm, or 730 mm×920 mm), the 5th generation (1100 mm×1300 mm), the 6th generation (1500 mm×1850 mm), the 7th generation (1870 mm×2200 mm), the 8th generation (2200 mm×2400 mm), the 9th generation (2400 mm×2800 mm, or 2450 mm×3050 mm), the 10th generation (2950 mm×3400 mm), and the like.

A base insulating layer may be provided between the substrate 300 and a gate insulating layer 304. The base insulating layer has the function of preventing diffusion of an impurity element from the substrate 300, and can be formed with a single-layer structure or a stacked-layer structure using one or more of a silicon nitride film, a silicon oxide film, a silicon nitride oxide film, and a silicon oxynitride film. The base insulating layer can be formed as appropriate by a sputtering method, a CVD method, a coating method, a printing method, or the like. A small amount of a halogen element such as fluorine or chlorine may be added to the base insulating layer so as to immobilize mobile ions of sodium or the like. The peak of the concentration of a halogen element to be contained in the base insulating layer, when measured by secondary ion mass spectrometry (SIMS), is preferably in the range of from $1 \times 10^{15}$ $cm^{-3}$ to $1 \times 10^{20}$ $cm^{-3}$.

The gate electrode layer 301, the wiring layer 302, and the wiring layer 303 (including a wiring layer or an electrode layer formed from the same layer as the gate electrode layer 301, the wiring layer 302, and the wiring layer 303) can each be formed to have a single-layer or stacked-layer structure using a metal material such as molybdenum, titanium, chromium, tantalum, tungsten, aluminum, copper, neodymium, or scandium or an alloy material which contains any of these materials as its main component.

For example, as a two-layer structure of the gate electrode layer 301, the wiring layer 302, and the wiring layer 303, any of the following structures is preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, a two-layer structure of a titanium nitride layer and a molybdenum layer, and a two-layer structure of a tungsten nitride layer and a tungsten layer. As a three-layer structure, a stack of a tungsten layer or a tungsten nitride layer, a layer of an alloy of aluminum and silicon or an alloy of aluminum and titanium, and a titanium nitride layer or a titanium layer is preferable.

Next, the gate insulating layer 304 is formed over the gate electrode layer 301, the wiring layer 302, and the wiring layer 303.

The gate insulating layer 304 can be formed to have a single-layer structure or a stacked-layer structure using one or more of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. In the case of forming a silicon oxide film by a sputtering method, a silicon target or a quartz target is used as a target, and oxygen or a mixed gas of oxygen and argon is used as a sputtering gas.

Note that a purified oxide semiconductor to be formed later (an i-type or substantially i-type oxide semiconductor obtained by removal of an impurity) is highly susceptible to interface states or interface charges; therefore, characteristics of the interface between the purified oxide semiconductor and the gate insulating layer (GI) are particularly important. Therefore, the gate insulating layer that is to be in contact with the purified oxide semiconductor needs to have high quality.

For example, a high-quality insulating layer which is dense and has high withstand voltage can be formed by a high density plasma CVD method using microwaves (2.45 GHz), which is preferable. This is because when the purified oxide semiconductor and the high-quality gate insulating layer are disposed in close contact with each other, interface states can be reduced and interface characteristics can be made favorable.

Needless to say, other film formation methods, such as a sputtering method or a plasma CVD method, can be employed as long as a high-quality insulating layer can be formed as the gate insulating layer. A gate insulating layer whose film quality is improved, or an insulating layer whose characteristics of an interface with the oxide semiconductor are improved, by heat treatment after the formation may be used. In any case, any insulating layer that has a reduced interface state density and can form a favorable interface with the oxide semiconductor as well as having favorable film quality as a gate insulating layer can be used.

Further, in a gate bias-temperature stress test (BT test) performed on a transistor at 85° C. and 2×10$^6$ V/cm for 12 hours, when the oxide semiconductor contains an impurity, a bond between the impurity and a main component of the oxide semiconductor is cleaved by a high electric field (B: bias) and a high temperature (T: temperature), and a generated dangling bond induces a drift of threshold voltage ($V_{th}$).

In contrast, the invention disclosed in this specification makes it possible to obtain a transistor which is stable to a BT test by removing an impurity, especially hydrogen, water, or the like, as much as possible from an oxide semiconductor to obtain a favorable characteristic of an interface between the oxide semiconductor and a gate insulating layer as described above.

The gate insulating layer 304 may have a stacked-layer structure in which a nitride insulating layer and an oxide insulating layer are stacked in this order over the gate electrode layer 301. For example, a 100 nm thick gate insulating layer is formed in such a manner that a silicon nitride layer (SiN$_y$ (y>0)) having a thickness of 50 nm to 200 nm is formed by a sputtering method as a first gate insulating layer and then a silicon oxide layer (SiO$_x$ (x>0)) having a thickness of 5 nm to 300 nm is stacked as a second gate insulating layer over the first gate insulating layer. The thickness of the gate insulating layer may be set as appropriate depending on characteristics needed for a transistor and may be approximately 350 nm to 400 nm.

When the gate insulating layer 304 is formed using a high-k material such as hafnium silicate (HfSi$_x$O$_y$ (x>0, y>0)), hafnium silicate (HfSi$_x$O$_y$ (x>0, y>0)) to which nitrogen is added, hafnium aluminate (HfAl$_x$O$_y$ (x>0, y>0)), hafnium oxide, or yttrium oxide, gate leakage current can be reduced. Further, a stacked structure can be employed, in which a high-k material and one or more of silicon oxide, silicon nitride, silicon oxynitride, silicon nitride oxide, and aluminum oxide are stacked.

In order to prevent the gate insulating layer 304 from containing hydrogen, a hydroxyl group, and moisture as much as possible, it is preferable to preheat the substrate 300 provided with the gate electrode layer 301 or the substrate 300 provided with the gate electrode layer 301 and the gate insulating layer 304 in a preheating chamber of a sputtering apparatus before the film formation so that an impurity such as hydrogen or moisture adsorbed on the substrate 300 is eliminated, and perform evacuation. Note that the temperature of the preheating is higher than or equal to 100° C. and lower than or equal to 400° C., preferably higher than or equal to 150° C. and lower than or equal to 300° C. As an evacuation unit provided in the preheating chamber, a cryopump is preferable. This preheating step is not necessarily performed.

Next, over the gate insulating layer 304, an oxide semiconductor layer 305 having a thickness of 2 nm to 200 nm is formed by a sputtering method (see FIG. 8A).

The oxide semiconductor layer 305 is formed by a sputtering method. The oxide semiconductor layer 305 can be formed using any of the following films: a four-component metal oxide film such as an In—Sn—Ga—Zn—O film; a three-component metal oxide film such as an In—Ga—Zn—O film, an In—Sn—Zn—O film, an In—Al—Zn—O film, a Sn—Ga—Zn—O film, an Al—Ga—Zn—O film, and a Sn—Al—Zn—O film; a two-component metal oxide film such as an In—Zn—O film, a Sn—Zn—O film, an Al—Zn—O film, a Zn—Mg—O film, a Sn—Mg—O film, an In—Mg—O film, and an In—Ga—O film; an In—O film; a Sn—O film; and a Zn—O film. In addition, the oxide semiconductor layer may include SiO$_2$.

As a target used to form the oxide semiconductor layer 305 by a sputtering method, a target of a metal oxide containing zinc oxide as a main component can be used. As another example of a target of a metal oxide, a metal oxide target containing In, Ga, and Zn (in a composition ratio, $In_2O_3:Ga_2O_3:ZnO=1:1:1$ [molar ratio], $In_2O_3:Ga_2O_3:ZnO=1:1:2$ [molar ratio]) can be used. Alternatively, as a metal oxide target containing In, Ga, and Zn, a target having a composition ratio of $In_2O_3:Ga_2O_3:ZnO=2:2:1$ [molar ratio] or $In_2O_3:Ga_2O_3:ZnO=1:1:4$ [molar ratio] can be used. The filling rate of the metal oxide target is 90% to 100%, preferably 95% to 99.9%. The oxide semiconductor layer 305 is dense when formed using the metal oxide target with high filling rate.

In this embodiment, the oxide semiconductor layer 305 is formed by a sputtering method using an In—Ga—Zn—O-based metal oxide target. Alternatively, the oxide semiconductor layer 305 can be formed by a sputtering method in a rare gas (typically, argon) atmosphere, an oxygen atmosphere, or a mixed atmosphere of a rare gas (typically, argon) and oxygen.

The oxide semiconductor layer 305 is formed over the substrate 300 in the following manner: the substrate is held in the treatment chamber with pressure reduced, and the substrate is heated to room temperature or a temperature lower than 400° C.; and residual moisture in the treatment chamber is removed, a sputtering gas from which hydrogen and moisture are removed is introduced, and an In—Ga—Zn—O-based metal oxide is used as a target. In order to remove moisture remaining in the treatment chamber, an entrapment vacuum pump is preferably used. For example, a cryopump, an ion pump, or a titanium sublimation pump is preferably used. The evacuation unit may be a turbo pump provided with a cold trap. From the treatment chamber evacuated with a cryopump, a hydrogen atom, a compound including a hydrogen atom such as water ($H_2O$) (preferably, also a compound including a carbon atom), or the like, for example, is sufficiently removed; thus, the concentration of an impurity in the oxide semiconductor film formed in the treatment chamber can be reduced. By performing film formation by sputtering while removing residual moisture in the treatment chamber using a cryopump pump, the substrate temperature during the formation of the oxide semiconductor layer 305 can be set higher than or equal to room temperature and lower than 400° C.

As an example of the film formation conditions, the following conditions are employed: the distance between the substrate and the target is 100 mm; the pressure is 0.6 Pa; the direct current (DC) power is 0.5 kW; and the atmosphere is oxygen (the proportion of oxygen flow is 100%). Note that a pulsed direct current (DC) power source is preferable because powder substances (also referred to as particles or dust) generated in film formation can be reduced and the film thickness can be uniform. The oxide semiconductor layer preferably has a thickness of 5 nm to 30 nm. Note that the appropriate thickness of the oxide semiconductor layer differs depending on the material to be used; therefore, the thickness may be determined as appropriate in accordance with the material.

Examples of a sputtering method include an RF sputtering method in which a high-frequency power source is used for a sputtering power source, a DC sputtering method in which a direct current power source is used, and a pulsed DC sputtering method in which a bias is applied in a pulsed manner. The RF sputtering method is mainly used in the case where an insulating film is formed, whereas the DC sputtering method is mainly used in the case where a metal film is formed.

There is also a multi-source sputtering apparatus in which a plurality of targets of different materials can be set. With the multi-source sputtering apparatus, films of different materials can be formed to be stacked in the same chamber, or a film of plural kinds of materials can be formed by electric discharge at the same time in the same chamber.

Alternatively, a sputtering apparatus provided with a magnet system inside the chamber and used for a magnetron sputtering method, or a sputtering apparatus used for an ECR sputtering method in which plasma generated with the use of microwaves is used without using glow discharge can be used.

Further, as a film formation method using a sputtering method, a reactive sputtering method in which a target substance and a sputtering gas component are chemically reacted with each other during film formation to form a thin compound film thereof, or a bias sputtering method in which a voltage is also applied to a substrate during film formation can be used.

As a sputtering gas used in formation of the oxide semiconductor layer, a high-purity gas in which the concentration of an impurity such as hydrogen, water, a hydroxyl group, or hydride is reduced to approximately the ppm level or the ppb level is preferably used.

Next, the oxide semiconductor layer 305 is processed into an oxide semiconductor layer 306 having an island shape in a second photolithography step (see FIG. 8B). A resist mask for forming the oxide semiconductor layer 306 having an island shape may be formed by an inkjet method. Formation of the resist mask by an inkjet method needs no photomask; thus, manufacturing cost can be reduced.

Note that the etching of the oxide semiconductor layer 305 may be dry etching, wet etching, or both dry etching and wet etching.

As an etching gas for the dry etching, a gas containing chlorine (a chlorine-based gas such as chlorine ($Cl_2$), boron trichloride ($BCl_3$), silicon tetrachloride ($SiCl_4$), or carbon tetrachloride ($CCl_4$)) is preferably used.

Alternatively, a gas containing fluorine (a fluorine-based gas such as carbon tetrafluoride ($CF_4$), sulfur hexafluoride ($SF_6$), nitrogen trifluoride ($NF_3$), or trifluoromethane ($CHF_3$)); hydrogen bromide (HBr); oxygen ($O_2$); any of these gases to which a rare gas such as helium (He) or argon (Ar) is added; or the like can be used.

As a dry etching method, a parallel plate reactive ion etching (RIE) method, an inductively coupled plasma (ICP) etching method, or the like can be used. In order to etch the layer into a desired shape, etching conditions (e.g., the amount of electric power applied to a coiled electrode, the amount of electric power applied to an electrode on the substrate side, and the electrode temperature on the substrate side) need to be set as appropriate.

An example of an etchant which can be used for wet etching includes a mixed solution of phosphoric acid, acetic acid, and nitric acid, an ammonia hydrogen peroxide mixture (hydrogen peroxide solution of 31 wt %:ammonia solution of 28 wt %:water=5:2:2 in volume ratio), or the like. An etchant such as ITO-07N (produced by KANTO CHEMICAL CO., INC.) may also be used.

The etchant after the wet etching is removed together with the etched materials by cleaning. The waste liquid containing the etchant and the material etched off may be purified and the material may be reused. When a material such as indium contained in the oxide semiconductor layer is collected from the waste liquid after the etching and is reused, the resources can be efficiently used and the cost can be reduced.

The etching conditions (such as an etchant, etching time, or temperature) are appropriately adjusted depending on a material so that the material can be etched into a desired shape.

Next, a semiconductor layer 307 is formed over the gate insulating layer 304. As the semiconductor layer 307, a semiconductor layer having a microcrystalline or polycrystalline structure can be formed by a known CVD or sputtering method. As a deposition gas in the case of formation by a CVD method, a gas containing silicon or germanium can be used. As a deposition gas containing silicon, silane ($SiH_4$), disilane ($Si_2H_6$), dichlorosilane ($SiH_2Cl_2$), $SiHCl_3$, silicon chloride ($SiCl_4$), silicon fluoride ($SiF_4$), or the like can be used. As a deposition gas containing germanium, germane ($GeH_4$), digermane ($Ge_2H_6$), germane fluoride ($GeF_4$), or the like can be used.

A polycrystalline semiconductor layer can be formed by forming an amorphous semiconductor layer or a microcrystalline semiconductor layer and then subjecting the semiconductor layer to heat treatment at 600° C. or more, RTA treatment, or laser light irradiation. Crystallization by RTA treatment or laser light irradiation, by which a semiconductor film can be instantaneously heated, is particularly effective in the case of forming a polycrystalline semiconductor layer over a substrate having a low strain point.

In addition, by placing an element which promotes crystallization in contact with an amorphous semiconductor layer or a microcrystalline semiconductor layer or adding the element thereto, the temperature of heat treatment for crystallization can be lowered to approximately 450° C. As a metal element which promotes crystallization, one or a plurality of kinds of metal such as iron (Fe), nickel (Ni), cobalt (Co), ruthenium (Ru), rhodium (Rh), palladium (Pd), osmium (Os), iridium (Ir), titanium (Ti), platinum (Pt), copper (Cu), and gold (Au) can be used.

In this embodiment, the semiconductor layer 307 is formed by forming an amorphous silicon layer by a plasma CVD method and then processing the amorphous silicon layer into an island-shaped semiconductor layer in a third photolithography step. In addition, as a metal element which promotes crystallization, nickel (Ni) is added to the semiconductor layer 307 (see FIG. 8C).

Next, the oxide semiconductor layer 306 is dehydrated or dehydrogenated. The temperature of first heat treatment for dehydration or dehydrogenation is set to 400° C. to 750° C., preferably 550° C. to 600° C. At this time, crystallization of the semiconductor layer 307 is also performed. Note that the heat treatment is performed for one hour or longer. Here, the substrate is introduced into an electric furnace which is one of heat treatment apparatuses, and the heat treatment of the oxide semiconductor layer is performed in a nitrogen atmosphere. After that, the oxide semiconductor layer is prevented from being exposed to the air, which prevents water or hydrogen from re-entering the oxide semiconductor layer. After that, cooling is performed by introduction of a high-purity oxygen gas, a high-purity $N_2O$ gas, or ultra-dry air (having a dew point of −40° C. or lower, preferably −60° C. or lower) into the same furnace. It is preferable that the oxygen gas or the $N_2O$ gas do not contain water, hydrogen, or the like. Alternatively, the purity of an oxygen gas or an $N_2O$ gas which is introduced into the heat treatment apparatus is preferably 6N (99.9999%) or higher, more preferably 7N (99.99999%) or higher (that is, the concentration of impurities in the oxygen gas or the $N_2O$ gas is 1 ppm or less, preferably 0.1 ppm or less).

Note that the heat treatment apparatus is not limited to an electric furnace. For example, a rapid thermal annealing (RTA) apparatus such as a gas rapid thermal annealing (GRTA) apparatus or a lamp rapid thermal annealing (LRTA) apparatus can be used. The LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. In addition, the LRTA apparatus may be provided with not only a lamp but also a device which heats an object to be processed by heat conduction or heat radiation from a heater such as a resistance heater. GRTA is a method for heat treatment using a high-temperature gas. As the gas, an inert gas which does not react by heat treatment with the object to be processed, like nitrogen or a rare gas such as argon, is used. The heat treatment may be performed at 600° C. to 750° C. for several minutes by an RTA method.

After the first heat treatment for dehydration or dehydrogenation, heat treatment may be performed at a temperature of 200° C. to 400° C., preferably 200° C. to 300° C., in an oxygen gas atmosphere or a $N_2O$ gas atmosphere.

Through the above steps, the oxide semiconductor layer 306 and a semiconductor layer 308 which is a polycrystalline semiconductor layer obtained from the semiconductor layer 307 are obtained (see FIG. 8D).

Although, in this embodiment, the semiconductor layer 308 is formed over the gate insulating layer 304 like the oxide semiconductor layer 306, the semiconductor layer 308 and the oxide semiconductor layer 306 may be formed in different layers. For example, even when the semiconductor layer 307 is formed in a layer below the oxide semiconductor layer 306 and the first heat treatment is performed, dehydration or dehydrogenation of the oxide semiconductor layer 306 and crystallization of the semiconductor layer 307 into a polycrystalline semiconductor layer can be performed at the same time.

Note that the oxide semiconductor used in this embodiment contains hydrogen at $5\times10^{19}/cm^3$ or less, preferably $5\times10^{18}/cm^3$ or less, more preferably $5\times10^{17}/cm^3$ or less or less than $1\times10^{16}/cm^3$, and hydrogen is removed from the oxide semiconductor. In other words, the oxide semiconductor is purified so that impurities that are not main components of the oxide semiconductor are contained as little as possible. Note that the hydrogen concentration of the oxide semiconductor layer can be measured by secondary ion mass spectrometry (SIMS).

In addition, the carrier density can be measured by the Hall effect measurement or capacitance-voltage (CV) measurement. The carrier density of the oxide semiconductor which is measured by the Hall effect measurement or the CV measurement is equivalent to $1.45\times10^{10}/cm^3$, which is the intrinsic carrier density of silicon, or lower. When calculation is performed according to Fermi-Dirac distribution law, the intrinsic carrier density of silicon is $10^{10}/cm^3$, whereas the intrinsic carrier density of an oxide semiconductor whose energy gap is 3 eV or more is $10^{-7}/cm^3$. That is, the intrinsic carrier density of the oxide semiconductor is extremely close to zero.

The energy gap is 2 eV or more, preferably 2.5 eV or more, more preferably 3 eV or more, and impurities such as hydrogen or the like that forms a donor are reduced as much as possible so that the carrier density becomes less than $1\times10^{14}/cm^3$, preferably less than $1\times10^{12}/cm^3$, more preferably less than $1\times10^{11}/cm^3$. In other words, the carrier density of the oxide semiconductor layer can be made as close to zero as possible. By using the oxide semiconductor layer with a wide energy gap, temperature characteristics can be stabilized within a practical temperature range of about room temperature to 180° C.

The oxide semiconductor in this embodiment is an intrinsic (i-type) or substantially intrinsic oxide semiconductor obtained by removal of hydrogen, which is an n-type impurity, from the oxide semiconductor and by increase in purity so that an impurity other than the main components of the oxide semiconductor is not included as much as possible. In other words, the oxide semiconductor in this embodiment is a purified i-type (intrinsic) oxide semiconductor or an oxide semiconductor which is close to a purified i-type oxide semiconductor obtained not by addition of an impurity but by removal of an impurity such as hydrogen, water, a hydroxyl group, or hydride as much as possible. In this manner, the Fermi level ($E_f$) can be at the same level as the intrinsic Fermi level ($E_i$).

When an oxide semiconductor which is purified by thoroughly removing hydrogen from the oxide semiconductor as described above is used for a channel formation region of a transistor, the drain current of the transistor can be $1 \times 10^{-13}$ A or less at drain voltages of 1 V and 10 V and a gate voltage in the range of from −5 V to −20 V even in the case where the channel width is 10 mm.

The off-state current per micrometer of channel width of the aforementioned transistor including the oxide semiconductor can be as small as 10 aA/μm ($1 \times 10^{-17}$ A/μm) or less, preferably 1 aA/μm ($1 \times 10^{-18}$ A/μm) or less, more preferably 1 zA/μm ($1 \times 10^{-21}$ A/μm) or less. As described above, when the oxide semiconductor is purified so that impurities that are not main components of the oxide semiconductor, typically hydrogen, water, a hydroxyl group, or hydride, are contained as little as possible, favorable operation of the transistor can be obtained.

Here, a principle of operation of a transistor including an oxide semiconductor will be described with reference to FIG. 15, FIG. 16, FIGS. 17A and 17B, and FIG. 18. Note that the following description is based on the assumption of an ideal situation for easy understanding and does not necessarily reflect a real situation. Note also that the following description is just a consideration and does not affect the validity of the invention.

Figure 15:
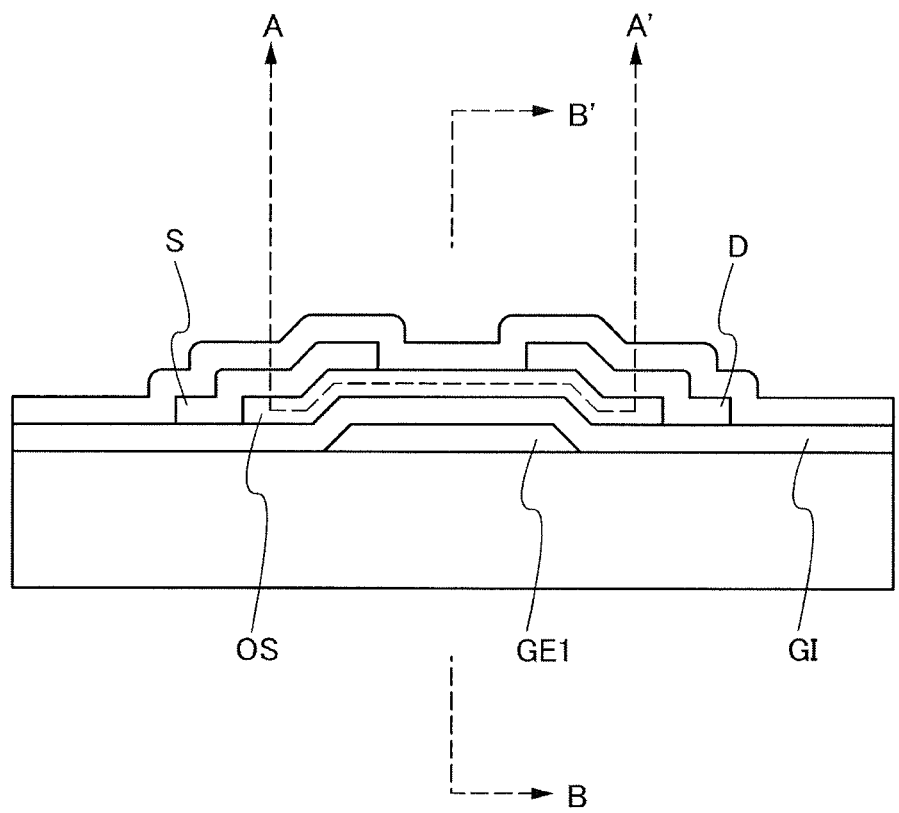
FIG. 15 is a cross-sectional view of a transistor including an oxide semiconductor.

FIG. 15 is a cross-sectional view of a transistor (thin film transistor) including an oxide semiconductor. An oxide semiconductor layer (OS) is provided over a first gate electrode (GE1) with a first gate insulating film (GI) interposed therebetween, and a source electrode (S) and a drain electrode (D) are provided thereover. In addition, an insulating layer is provided so as to cover the source electrode (S) and the drain electrode (D).

Figure 16:
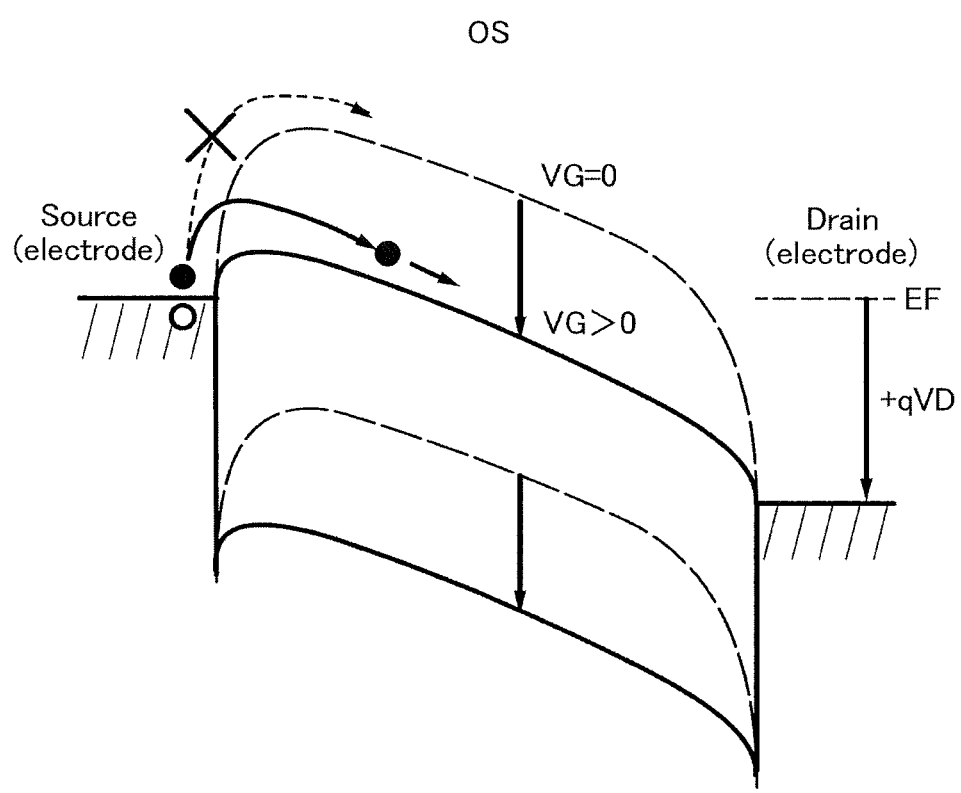
FIG. 16 is energy band diagram along an A-A' section in FIG. 15.

FIG. 16 is an energy band diagram (schematic diagram) along an A-A' section in FIG. 15. In FIG. 16, a black circle (●) and a white circle (○) represent an electron and a hole and have electric charges (−q, +q), respectively. With a positive voltage ($V_D$>0) applied to the drain electrode, the dashed line shows the case where no voltage is applied to the gate electrode (VG=0) and the solid line shows the case where a positive voltage is applied to the gate electrode (VG>0). In the case where voltage is not applied to the gate, a carrier (electron) is not injected to the oxide semiconductor side from an electrode because of a high potential barrier, so that current does not flow, which means an off state. On the other hand, when a positive voltage is applied to the gate electrode, potential barrier is lowered, and thus a current flows, which means an on state.

FIGS. 17A and 17B are energy band diagrams (schematic diagrams) along a B-B' section in FIG. 15. FIG. 17A illustrates an on state in which a positive potential (VG>0) is applied to the first gate electrode (GE1) and carriers (electrons) flow between the source and the drain. FIG. 17B illustrates an off state in which a negative potential (VG<0) is applied to the first gate electrode (GE1) and minority carriers do not flow.

Figure 18:
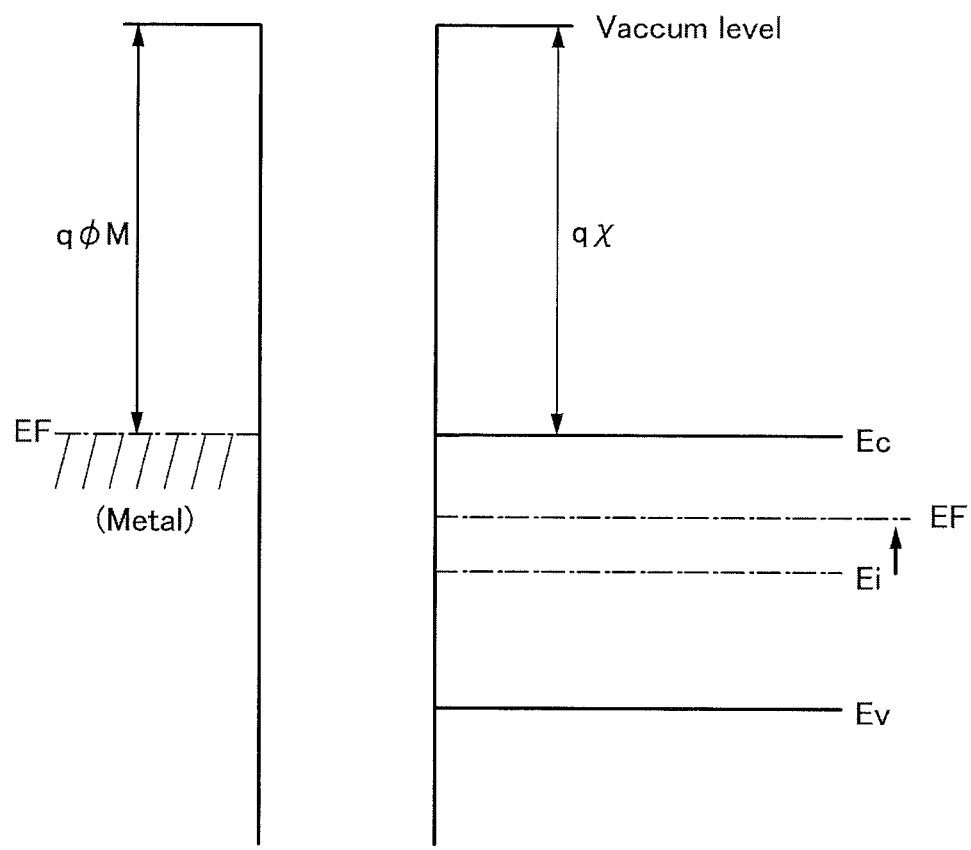
FIG. 18 illustrates the relationships between the vacuum level and the work function of a metal and between the vacuum level and the electron affinity of an oxide semiconductor.

FIG. 18 illustrates the relationships between the vacuum level and the work function of a metal (φM) and between the vacuum level and the electron affinity (χ) of an oxide semiconductor. At normal temperature, electrons in the metal are degenerated and the Fermi level is located in the conduction band. On the other hand, a conventional oxide semiconductor is an n-type semiconductor, in which the Fermi level (EF) is away from the intrinsic Fermi level (Ei) located in the middle of a band gap and is located closer to the conduction band. Note that it is known that part of hydrogen is a donor in an oxide semiconductor and is one factor causing an oxide semiconductor to be an n-type semiconductor.

On the other hand, an oxide semiconductor of the present invention is an intrinsic (i-type) or substantially intrinsic oxide semiconductor which is obtained by removing hydrogen that is an n-type impurity from an oxide semiconductor and purifying the oxide semiconductor such that an impurity other than a main component of the oxide semiconductor is prevented from being contained therein as much as possible. In other words, a feature is that a purified i-type (intrinsic) semiconductor, or a semiconductor close thereto, is obtained not by adding an impurity but by removing an impurity such as hydrogen or water as much as possible. In this manner, the Fermi level (EF) can be at the same level as the intrinsic Fermi level (Ei).

In the case where the band gap (Eg) of an oxide semiconductor is 3.15 eV, the electron affinity (χ) is said to be 4.3 eV. The work function of titanium (Ti) included in the source electrode and the drain electrode is substantially equal to the electron affinity (χ) of the oxide semiconductor. In that case, a Schottky barrier for electrons is not formed at an interface between the metal and the oxide semiconductor.

At that time, the electron moves in the vicinity of the interface between the gate insulating layer and the purified oxide semiconductor (the lowest portion of the oxide semiconductor which is stable in terms of energy) as illustrated in FIG. 17A.

In addition, as illustrated in FIG. 17B, when a negative potential is applied to the gate electrode (GE1), the value of current is extremely close to zero because holes that are minority carriers are substantially zero.

In such a manner, an intrinsic (i-type) or substantially intrinsic oxide semiconductor is obtained by being purified such that an element other than its main element (i.e., an impurity element) is contained as little as possible. For that reason, the gate insulating layer needs to form a favorable interface with the oxide semiconductor. Specifically, it is preferable to use the following insulating layer, for example: an insulating layer formed with a CVD method using high-density plasma generated with a power source frequency in the range of the VHF band to the microwave band, or an insulating layer formed with a sputtering method.

When the interface between the oxide semiconductor and the gate insulating layer is made favorable while the oxide semiconductor is highly purified, in the case where the transistor has a channel width W of $1 \times 10^4$ μm and a channel length L of 3 μm, for example, it is possible to realize an off-state current of $1 \times 10^{-13}$ A or less and a subthreshold swing (S value) of 0.1 V/dec at room temperature (with a 100-nm-thick gate insulating layer).

When the oxide semiconductor is highly purified as described above so as to contain an element other than its main component (i.e., an impurity element) as little as possible, the transistor can operate in a favorable manner.

Therefore, not by simply using an oxide semiconductor having a wide band gap for a transistor but by purifying the oxide semiconductor such that an impurity other than a main component can be prevented from being contained therein as much as possible so that the carrier density becomes less than $1\times10^{14}/cm^3$, preferably less than $1\times10^{12}/cm^3$, more preferably less than $1\times10^{11}/cm^3$, carriers to be thermally excited at a practical operation temperature can be eliminated, and the transistor can be operated only with carriers that are injected from the source side. This makes it possible to decrease the off-state current to $1\times10^{-17}$ A or less and to obtain a transistor whose off-state current hardly changes with a change in temperature and which is capable of extremely stable operation.

A technical idea of the present invention is that an impurity is not added to an oxide semiconductor and on the contrary the oxide semiconductor itself is purified by removing an impurity such as water or hydrogen which undesirably exists therein. In other words, a feature of an embodiment of the present invention is that an oxide semiconductor itself is purified by removing water or hydrogen which forms a donor level and further by sufficiently supplying oxygen to eliminate oxygen defects.

In an oxide semiconductor, even shortly after the film formation, hydrogen is observed on the order of $10^{20}/cm^3$ by secondary ion mass spectrometry (SIMS). One technical idea of the present invention is to purify an oxide semiconductor and obtain an electrically i-type (intrinsic) semiconductor by intentionally removing an impurity such as water or hydrogen which forms a donor level and further by adding oxygen (one of components of the oxide semiconductor), which decreases at the same time as removing water or hydrogen, to the oxide semiconductor.

As a result, it is preferable that the amount of hydrogen be as small as possible, and it is also preferable that the number of carriers in the oxide semiconductor be as small as possible. The oxide semiconductor is a purified i-type (intrinsic) semiconductor from which carriers have been eliminated and to which a meaning as a path of carriers as a semiconductor is given, rather than intentionally including carriers as a semiconductor, when used for an insulated-gate transistor.

As a result, by completely eliminating carriers from an oxide semiconductor or significantly reducing carries therein, the off-state current of an insulated-gate transistor can be decreased, which is a technical idea of an embodiment of the present invention. In other words, as a criterion, the carrier density should be less than $1\times10^{14}/cm^3$, preferably less than $1\times10^{12}/cm^3$, more preferably less than $1\times10^{11}/cm^3$. According to a technical idea of the present invention, the ideal carrier density is zero or close to zero.

In addition, as a result, the oxide semiconductor functions as a path, and the oxide semiconductor itself is an i-type (intrinsic) semiconductor which is purified so as to include no carriers or extremely few carriers, and carriers are supplied by an electrode on the source side. The degree of supply is determined by the barrier height that is obtained from the electron affinity $\chi$ of the oxide semiconductor, the Fermi level, which ideally corresponds to the intrinsic Fermi level, and the work function of the source or drain electrode.

Therefore, it is preferable that off-state current be as small as possible, and as characteristics of an insulated-gate transistor to which a drain voltage of 1 V to 10 V is applied, the off-state current (the current per micrometer of channel width) is 10 aA/μm or less, preferably 1 aA/μm or less.

Next, an n-type impurity region 308a and a p-type impurity region 308c are formed in the semiconductor layer 308 by adding an impurity element serving as a donor or an acceptor. The impurity element can be added by using an ion doping apparatus. In an ion doping apparatus, a source gas is excited to produce plasma, ions are extracted from the plasma, and an object to be processed is irradiated with the ions without mass separation. By using an ion doping apparatus, ions can be homogeneously introduced into the semiconductor layer 308. Note that in an ion doping apparatus provided with a mass separator, ion implantation with mass separation can be performed.

First, in a fourth photolithography step, a resist mask is formed over a region other than a region to be the n-type impurity region 308a. Note that the resist mask may be formed by an inkjet method. Formation of the resist mask by an inkjet method needs no photomask; thus, manufacturing cost can be reduced.

Next, in this embodiment, phosphine ($PH_3$) is used as a source gas containing an impurity element, and an impurity element imparting n-type conductivity is added so as to be contained in the n-type impurity region 308a at a concentration of approximately $1\times10^{19}/cm^3$ to $5\times10^{20}/cm^3$. In this embodiment, phosphorus (P) is used as the impurity element imparting n-type conductivity.

Next, in a fifth photolithography step, a resist mask is formed over a region other than a region to be the p-type impurity region 308c.

Next, in this embodiment, diborane ($B_2H_6$) is used as a source gas containing an impurity element, and an impurity element imparting p-type conductivity is added so as to be contained in the p-type impurity region 308c at a concentration of approximately $1\times10^{19}/cm^3$ to $5\times10^{20}/cm^3$. In this embodiment, boron (B) is used as the impurity element imparting p-type conductivity.

An i-type region 308b sandwiched between the n-type impurity region 308a and the p-type impurity region 308c functions as an intrinsic semiconductor. Ideally, an intrinsic semiconductor refers to a semiconductor which does not contain an impurity and whose Fermi level is positioned substantially in the middle of a forbidden band, and may be adjusted by adding an impurity serving as a donor (e.g., phosphorus (P) or the like) or an impurity serving as an acceptor (e.g., boron (B) or the like) such that the Fermi level is positioned in the middle of a forbidden bond (see FIG. 9A).

Although, in this embodiment, the impurity is added to the semiconductor layer 308 after the first heat treatment, the impurity may be added before the first heat treatment.

Note that the wiring layer 303 also functions as a light blocking film for preventing the semiconductor layer 308 from being irradiated with light incident from the substrate side. Furthermore, the external light 350 which has passed through the semiconductor layer 308 is reflected and made to be incident on the semiconductor layer 308 again; accordingly, the optical sensor 392 can have favorable detection sensitivity.

Next, in a sixth photolithography step, a resist mask is formed and part of the gate insulating layer which overlaps the wiring layer 303 is selectively removed by etching to form a contact hole 309. After that, the resist mask is removed.

Then, a conductive layer for forming an electrode layer 310a and an electrode layer 310b which function as source or drain electrode layers is faulted over the gate insulating layer 304 and the oxide semiconductor layer 306. The conductive layer may be formed by a sputtering method or a vacuum evaporation method. As a material of the conductive layer to be the source electrode layer and the drain electrode layer (including a wiring layer or an electrode layer formed from the same layer as the source electrode layer and the drain electrode layer), an element selected from Al, Cr, Cu, Ta, Ti, Mo, and W, an alloy including any of these elements as a component, an alloy film including any of these elements in combination, or the like can be given. Alternatively, a structure may be employed, in which a high-melting-point metal layer of Cr, Ta, Ti, Mo, W, or the like is stacked over one or both of metal layers of Al, Cu, or the like. Still alternatively, when an element which prevents generation of hillocks and whiskers in an Al film, such as Si, Ti, Ta, W, Mo, Cr, Nd, Sc, or Y, is added to an Al material, heat resistance of the Al material can be increased.

The conductive layer may have a single-layer structure or a stacked-layer structure of two or more layers. For example, a single-layer structure of an aluminum film including silicon, a two-layer structure in which a titanium film is stacked over an aluminum film, a three-layer structure in which a titanium film, an aluminum film, and a titanium film are stacked in this order, and the like can be given.

Alternatively, the conductive layer to be the source electrode layer and the drain electrode layer (including a wiring layer formed from the same layer as the source electrode layer and the drain electrode layer) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), or any of the metal oxide materials containing silicon or silicon oxide can be used.

In a seventh photolithography step, a resist mask is formed over the conductive layer and the electrode layer 310a, the electrode layer 310b, an electrode layer 311a, and an electrode layer 311b are formed by selective etching. After that, the resist mask is removed (see FIG. 9B). The electrode layer 311a is connected to the n-type impurity region 308a and connected to the wiring layer 303 through the contact hole 309. The electrode layer 311b is connected to the p-type impurity region 308c and connected to a common wiring layer which is not illustrated. One of the electrode layer 310a and the electrode layer 310b connected to the oxide semiconductor layer 306 functions as a source electrode layer of a transistor, and the other functions as a drain electrode layer of the transistor.

Light exposure at the time of the formation of the resist mask in the seventh photolithography step is performed using ultraviolet light, KrF laser light, or ArF laser light. The channel length L of the transistor is determined by a distance between an edge portion of the electrode layer 310a in contact with the oxide semiconductor layer 306 and an edge portion of the electrode layer 310b in contact with the oxide semiconductor layer 306, which are adjacent to each other over the oxide semiconductor layer 306. In the case where light exposure is performed for a channel length L of less than 25 nm, the light exposure at the time of the formation of the resist mask in the seventh photolithography step is performed using extreme ultraviolet light having an extremely short wavelength of several nanometers to several tens of nanometers. In the light exposure by extreme ultraviolet light, the resolution is high and the focus depth is large. Accordingly, the channel length L of the transistor can be made to be 10 nm to 1000 nm, the operation speed of a circuit can be increased, and low power consumption can be achieved because of extremely small off-state current.

Note that each material and etching conditions are adjusted as appropriate such that the oxide semiconductor layer 306 is not removed by the etching of the conductive layer.

In this embodiment, a Ti film is used as the conductive layer, an In—Ga—Zn—O-based oxide semiconductor is used for the oxide semiconductor layer 306, and an ammonium hydrogen peroxide solution is used as an etchant.

Note that in the seventh photolithography step, in some cases, part of the oxide semiconductor layer 306 is etched, whereby an oxide semiconductor layer having a groove (a depression portion) may be formed. The resist mask used for forming the electrode layer 310a and the electrode layer 310b may be formed by an inkjet method. Formation of the resist mask by an inkjet method needs no photomask; thus, manufacturing cost can be reduced.

In order to reduce the number of photomasks used in photolithograph steps and the number of steps, etching may be performed with the use of a resist mask formed using a multi-tone mask which is a light-exposure mask through which light is transmitted so as to have a plurality of intensities. Since a resist mask formed using a multi-tone mask has a plurality of thicknesses and can be further changed in shape by performing etching, the resist mask can be used in a plurality of etching steps to provide different patterns. Therefore, a resist mask corresponding to at least two kinds of different patterns can be formed by using one multi-tone mask. Thus, the number of light-exposure masks can be reduced and the number of corresponding photolithography steps can also be reduced, whereby simplification of the manufacturing process can be realized.

After the seventh photolithography step is finished and the resist mask is removed, plasma treatment using a gas such as $N_2O$, $N_2$, or Ar may be performed to remove water or the like adsorbed on a surface of the oxide semiconductor layer which is exposed. Plasma treatment may be performed using a mixed gas of oxygen and argon.

In the case where the plasma treatment is performed, the insulating layer 312 is formed without exposure to the air as an oxide insulating layer which is in contact with part of the oxide semiconductor layer and serves as a protective insulating film (see FIG. 9C). In this embodiment, in a region where the oxide semiconductor layer 306 does not overlap with the electrode layer 310a and the electrode layer 310b, the oxide semiconductor layer 306 and the insulating layer 312 are formed in contact with each other.

In this embodiment, as the insulating layer 312, a silicon oxide layer including defects is formed by a sputtering method by using a target of a silicon semiconductor and introducing, as a sputtering gas, a gas containing high-purity oxygen in which hydrogen and moisture are reduced, while heating the substrate 300 to room temperature or to a temperature lower than 100° C.

For example, the silicon oxide layer is formed as follows: a silicon target doped with boron (with a resistivity of 1 Ω·m) and which has a purity of 6N is used; the distance between the target and the substrate (T-S distance) is 89 mm; the pressure is 0.4 Pa; the direct current (DC) power is 6 kW; the atmosphere is oxygen (the proportion of oxygen flow is 100%); and a pulsed DC sputtering method is used. The thickness thereof is 300 nm. Note that instead of a silicon target, quartz (preferably, synthetic quartz) can be used as the target for forming the silicon oxide layer. As a sputtering gas, oxygen or a mixed gas of oxygen and argon is used.

In that case, it is preferable to remove residual moisture in the treatment chamber in the formation of the insulating layer 312. This is in order to prevent the oxide semiconductor layer 306 and the insulating layer 312 from containing hydrogen, a hydroxyl group, or moisture.

In order to remove moisture remaining in the treatment chamber, an entrapment vacuum pump is preferably used. For example, a cryopump, an ion pump, or a titanium sublimation pump is preferably used. The evacuation unit may be a turbo pump provided with a cold trap. From the treatment chamber evacuated with a cryopump, a hydrogen atom, a compound including a hydrogen atom such as water ($H_2O$), or the like, for example, is sufficiently removed; thus, the concentration of an impurity in the insulating layer 312 formed in the treatment chamber can be reduced.

As the insulating layer 312, instead of the silicon oxide layer, a silicon oxynitride layer, an aluminum oxide layer, an aluminum oxynitride layer, or the like can be used.

Further, heat treatment at 100° C. to 400° C. may be performed in a state where the insulating layer 312 is in contact with the oxide semiconductor layer 306. Because the insulating layer 312 in this embodiment includes many defects, an impurity such as hydrogen, moisture, a hydroxyl group, or hydride included in the oxide semiconductor layer 306 is diffused into the insulating layer 312 by this heat treatment, so that the impurity included in the oxide semiconductor layer 306 can further be reduced.

A protective insulating layer may be provided over the oxide insulating layer. In this embodiment, a protective insulating layer 313 is formed over the insulating layer 312. As the protective insulating layer 313, a silicon nitride film, a silicon nitride oxide film, an aluminum nitride film, an aluminum nitride oxide film, or the like is used.

As the protective insulating layer 313, a silicon nitride film is formed by a sputtering method by introducing a sputtering gas containing high-purity nitrogen in which hydrogen and moisture are reduced and by using a silicon target, while heating the substrate 300, which is provided with layers to and including the insulating layer 312, to a temperature of 100° C. to 400° C. In that case, it is also preferable that residual moisture be removed from the treatment chamber in the formation of the protective insulating layer 313 as in the case of the insulating layer 312.

In the case where the protective insulating layer 313 is formed, the substrate 300 is heated to a temperature of 100° C. to 400° C. in the formation of the protective insulating layer 313, whereby hydrogen or moisture included in the oxide semiconductor layer can be diffused into the oxide insulating layer. In that case, heat treatment after the formation of the insulating layer 312 is not necessarily performed.

In the case where a silicon oxide layer is formed as the insulating layer 312 and a silicon nitride layer is stacked thereover as the protective insulating layer 313, the silicon oxide layer and the silicon nitride layer can be formed in the same treatment chamber using a common silicon target. First, an etching gas containing oxygen is introduced and a silicon oxide layer is formed using a silicon target placed inside the treatment chamber; then, the etching gas is switched to an etching gas containing nitrogen and a silicon nitride layer is formed using the same silicon target. Because the silicon oxide layer and the silicon nitride layer can be formed in succession without exposure to the air, an impurity such as hydrogen or moisture can be prevented from being adsorbed on a surface of the silicon oxide layer. In that case, after the silicon oxide layer is formed as the insulating layer 312 and the silicon nitride layer is stacked thereover as the protective insulating layer 313, heat treatment (at a temperature of 100° C. to 400° C.) for diffusing hydrogen or moisture included in the oxide semiconductor layer into the oxide insulating layer may be performed.

After the formation of the protective insulating layer 313, heat treatment may be performed in the air at a temperature of 100° C. to 200° C. for 1 hour to 30 hours. This heat treatment may be performed at a fixed heating temperature. Alternatively, the following change in the heating temperature may be conducted plural times repeatedly: the heating temperature is raised from room temperature to a temperature of 100° C. to 200° C. and then lowered to room temperature. Further, this heat treatment may be performed under a reduced pressure before the formation of the oxide insulating layer. Under the reduced pressure, the heat treatment time can be shortened. By this heat treatment, a transistor which is normally off can be obtained. Therefore, reliability of a display device can be improved.

Further, by removing residual moisture from the reaction atmosphere at the time of the formation of the oxide semiconductor layer, in which a channel formation region is to be formed, over the gate insulating layer, the concentration of hydrogen or hydride in the oxide semiconductor layer can be reduced.

The above-described process can be used for manufacturing a backplane (a substrate provided with a transistor) of a liquid crystal display panel, an electroluminescent display panel, a display device using electronic ink, or the like.

Through the above-described process, the transistor 390 including the oxide semiconductor layer 306 in which the concentration of hydrogen, moisture, a hydroxyl group, or hydride is reduced can be formed (see FIG. 9C).

Next, in an eighth photolithography step, a resist mask is formed and the insulating layer 312 and the protective insulating layer 313 are selectively removed by etching to form a contact hole 314.

Then, a conductive layer is formed using a material similar to that of the gate electrode layer 301. In a ninth photolithography step, a resist mask is formed and the conductive layer is selectively removed by etching to form an electrode layer 315. Here, a single layer of titanium is formed as the electrode layer 315, and then dry etching is conducted using a mixed gas of $BCl_3$ and $Cl_2$. The electrode layer 315 is connected to the wiring layer 302 through the contact hole 314 (see FIG. 9D).

At this time, part of the conductive layer may be left so as to overlap the oxide semiconductor layer 306; thus, a gate electrode layer 360 may be formed. In this embodiment, the gate electrode layer 360 functions as a so-called back gate. With the gate electrode layer 360, electric field in the oxide semiconductor layer 306 can be controlled, whereby electrical characteristics of the transistor 390 can be controlled. Note that the gate electrode layer 360 may be electrically connected to another wiring layer, electrode, or the like so that a potential is applied to the gate electrode layer 360, or may be insulated so as to be in a floating state.

Next, a first semiconductor film, a second semiconductor film, and a third semiconductor film are stacked in this order over the electrode layer 315. Here, the first semiconductor film is an n-type semiconductor layer and is formed with an amorphous silicon film containing an impurity element imparting n-type conductivity. The first semiconductor film is formed by a plasma CVD method with the use of a semiconductor source gas containing an impurity element belonging to Group 15 (such as phosphorus (P)). As the semiconductor source gas, silane ($SiH_4$) may be used. Alternatively, $Si_2H_6$, $SiH_2Cl_2$, $SiHCl_3$, $SiCl_4$, $SiF_4$, or the like may be used. Alternatively, an amorphous silicon film which does not contain an impurity element may be formed, and then, an impurity element may be introduced into the amorphous silicon film by a diffusion method or an ion implantation method. After the impurity element is introduced by an ion implantation method or the like, heating or the like may be conducted in order to diffuse the impurity element. In that case, as a method for forming the amorphous silicon film, an LPCVD method, a vapor deposition method, a sputtering method, or the like may be used. The first semiconductor film is preferably formed so as to have a thickness of 20 nm to 200 nm.

The second semiconductor film is an i-type semiconductor layer (intrinsic semiconductor layer) and is formed with an amorphous silicon film. As the second semiconductor film, an amorphous silicon film is formed by a plasma CVD method with the use of a semiconductor source gas. As the semiconductor source gas, silane ($SiH_4$) may be used. Alternatively, $Si_2H_6$, $SiH_2Cl_2$, $SiHCl_3$, $SiCl_4$, $SiF_4$, or the like may be used. The second semiconductor film may be alternatively formed by an LPCVD method, a vapor deposition method, a sputtering method, or the like. The second semiconductor film is preferably formed so as to have a thickness of 200 nm to 1000 nm.

The third semiconductor film is a p-type semiconductor layer and is formed with an amorphous silicon film containing an impurity element imparting p-type conductivity. The third semiconductor film is formed by a plasma CVD method with the use of a semiconductor source gas containing an impurity element belonging to Group 13 (such as boron (B)). As the semiconductor source gas, silane ($SiH_4$) may be used. Alternatively, $Si_2H_6$, $SiH_2Cl_2$, $SiHCl_3$, $SiCl_4$, $SiF_4$, or the like may be used. Alternatively, an amorphous silicon film which does not contain an impurity element may be formed, and then, an impurity element may be introduced into the amorphous silicon film by a diffusion method or an ion implantation method. After the impurity element is introduced by an ion implantation method or the like, heating or the like may be conducted in order to diffuse the impurity element. In that case, as a method for forming the amorphous silicon film, an LPCVD method, a vapor deposition method, a sputtering method, or the like may be used. The third semiconductor film is preferably formed so as to have a thickness of 10 nm to 50 nm.

The first semiconductor film and the third semiconductor film may be formed using a polycrystalline semiconductor or a microcrystalline semiconductor instead of an amorphous semiconductor.

Next, in a ninth photolithography step, a resist mask is formed and an unnecessary portion of the first semiconductor film, the second semiconductor film, and the third semiconductor film is selectively removed by etching to form a first semiconductor layer 316, a second semiconductor layer 317, and a third semiconductor layer 318 (see FIG. 10A). Here, dry etching is conducted using a mixed gas of $CF_4$ and $Cl_2$, a mixed gas of $CF_4$ and $O_2$, or a mixed gas of $CHF_3$ and He, so that etching residue is not left over a tapered portion.

Note that the electrode layer 315 also functions as a light blocking film for preventing the second semiconductor layer 317 from being irradiated with light incident from the substrate side. Furthermore, the external light 350 which has passed through the first semiconductor layer 316, the second semiconductor layer 317, and the third semiconductor layer 318 is reflected and made to be incident on the second semiconductor layer 317 again; accordingly, the optical sensor 391 can have favorable detection sensitivity.

Next, an insulating layer 319 is formed. The insulating layer 319 can be formed with a single-layer structure or a stacked-layer structure using one or more of a silicon nitride film, a silicon oxide film, a silicon nitride oxide film, and a silicon oxynitride film. Here, a silicon oxide film is formed as the insulating layer 319.

Next, in a tenth photolithography step, a resist mask is formed and the insulating layer 319 over the third semiconductor layer 318 is selectively removed by etching to form a contact hole 320.

Then, a conductive film is formed using a material similar to that of the gate electrode layer 301. In an eleventh photolithography step, a resist mask is formed and an unnecessary portion of the conductive film is selectively removed by etching to form an electrode layer 321. Here, the conductive film is formed by stacking a film containing aluminum as its main component and a titanium film by a sputtering method.

The electrode layer 321 is connected to the third semiconductor layer 318 through the contact hole 320 and connected to a common wiring layer which is not illustrated.

Through the above manufacturing process, a transistor and optical sensors can be formed over the substrate. In this embodiment, the PIN photodiode included in the optical sensor 392 is a lateral PIN photodiode in which a P layer, an I layer, and an N layer are laterally arranged side by side, but may have a structure in which a P layer, an I layer, and an N layer are stacked vertically like the PIN photodiode included in the optical sensor 391.

Figure 11:
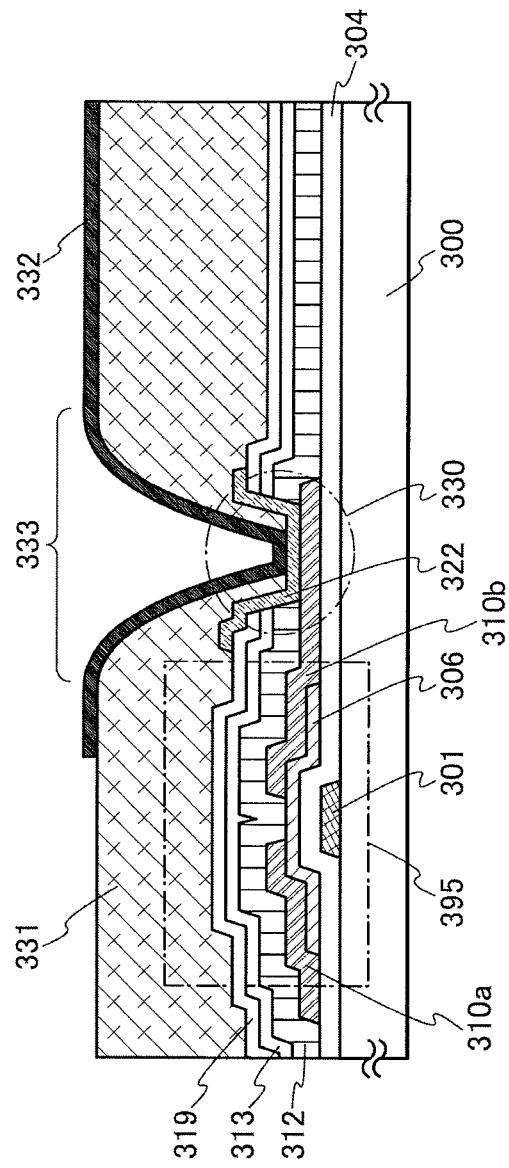
FIG. 11 illustrates a structure of a pixel switching transistor.

FIG. 11 illustrates an example in which the transistor manufactured through the above process is used as a pixel switching transistor. A transistor 395 is a transistor including the oxide semiconductor layer 306 and can be manufactured in a manner substantially similar to that of the transistor 390 illustrated in FIGS. 8A to 8D, FIGS. 9A to 9D, and FIGS. 10A and 10B. Although the transistor 395 does not include the gate electrode layer 360 which functions as a back gate, if necessary, a back gate may be formed as appropriate.

In FIG. 11, an insulating layer 331 is formed over the transistor 395 as a planarization insulating layer, and a pixel electrode layer 332 is formed over the insulating layer 331. The insulating layer 331 can be formed using an organic material having heat resistance, such as polyimide, an acrylic resin, a benzocyclobutene-based resin, polyamide, or an epoxy resin. Other than such organic materials, it is also possible to use a low-dielectric constant material (a low-k material), a siloxane-based resin, phosphosilicate glass (PSG), borophosphosilicate glass (BPSG), or the like. Note that the insulating layer 331 may be formed by stacking a plurality of insulating layers formed using any of these materials.

The pixel electrode layer 332 can be formed using a material similar to that of the gate electrode layer, the source electrode layer, or the drain electrode layer.

Next, a process after the formation of the transistor 395 to the formation of the pixel electrode layer 332 is described. After the insulating layer 319 is formed, in the tenth photolithography step, the contact hole 320 is formed. At the same time, the insulating layer 312, the protective insulating layer 313, and the insulating layer 319 over the electrode layer 310b are selectively removed by etching to form a contact hole 330.

Next, in the eleventh photolithography step, a resist mask is formed and an unnecessary portion of the conductive film is selectively removed by etching to form the electrode layer 321. At the same time as the formation of the electrode layer 321, an electrode layer 322 is formed to cover the contact hole 330.

Then, the insulating layer 331 which functions as a planarization insulating layer is formed. In this embodiment, a photosensitive polyimide resin is used, and in a twelfth photolithography step, a polyimide resin over the electrode layer 322 is selectively removed to form a contact hole 333. With the use of a photosensitive material, the formation of a resist mask can be omitted.

Then, a conductive layer for forming a pixel electrode is formed over the insulating layer 331. In this embodiment, the conductive layer is formed using ITO. After that, in a thirteenth photolithography step, a resist mask is formed and an unnecessary portion of the conductive layer is selectively removed by etching to form the pixel electrode layer 332. The pixel electrode layer 332 is connected to the electrode layer 310b through the electrode layer 322.

Through the above manufacturing process, a pixel switching transistor can be formed over the substrate.

Figure 12A:
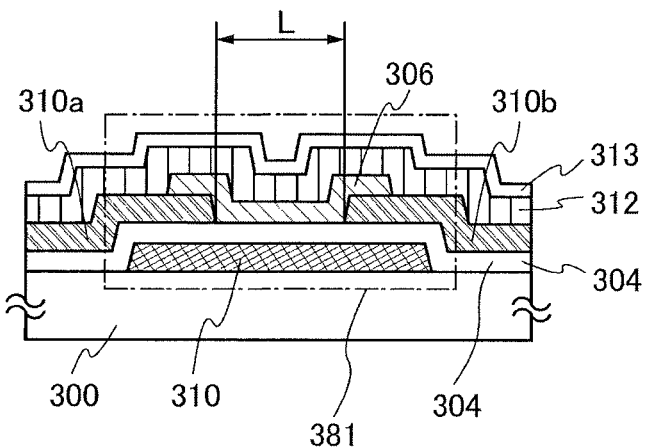
FIGS. 12A to 12C each illustrate a structure of a transistor.
Figure 12B:
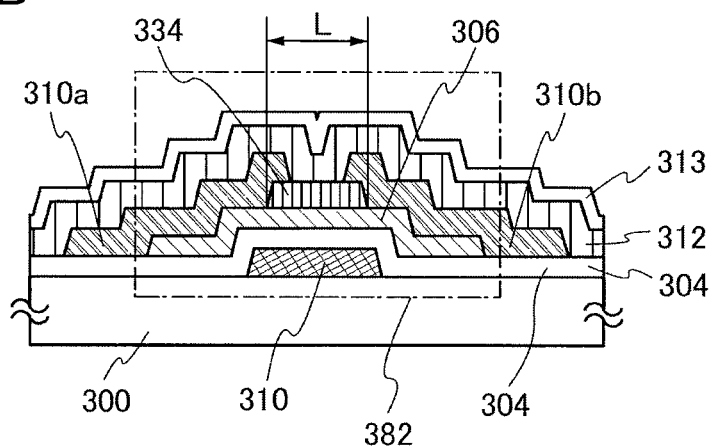
Figure 12C:
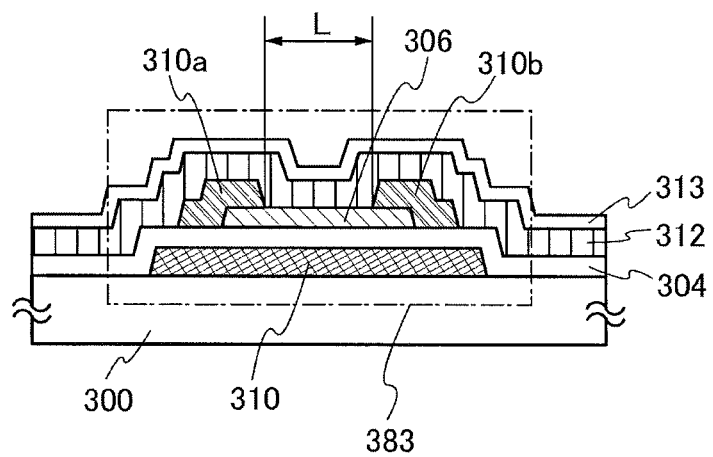

Although a method for manufacturing the transistor 395 of a channel-etched type having a bottom-gate structure is described in this embodiment, a structure of this embodiment is not limited thereto. A transistor 381 of a bottom-contact type (also referred to as an inverted-coplanar type) having a bottom-gate structure as illustrated in FIG. 12A, a transistor 382 of a channel-protective type (also referred to as a channel-stop type) including a channel protective layer 334 as illustrated in FIG. 12B, or the like can also be formed using similar materials and similar methods. FIG. 12C illustrates another example of a transistor of a channel-etched type which is different from the transistor 395. A transistor 383 illustrated in FIG. 12C has a structure in which the gate electrode layer 310 extends to an outer side beyond an edge portion of the oxide semiconductor layer 306.

Note that the channel length L of the transistor of a channel-etched type is defined by a distance between the electrode layer 310a and the electrode layer 310b as described above, and the channel length of the transistor of a channel-protective type is defined by the length of the channel protective layer 334 in contact with the oxide semiconductor layer 306 in a direction parallel with a carrier flow direction.

Embodiment 4

In this embodiment, a schematic view, circuit diagrams, a timing chart, and the like of a liquid crystal display device will be described with reference to FIGS. 13A to 13C and FIG. 14, and an effect of a structure of this embodiment will be described. First, a schematic view of a liquid crystal display device is described with reference to FIG. 13A.

Figure 13A:
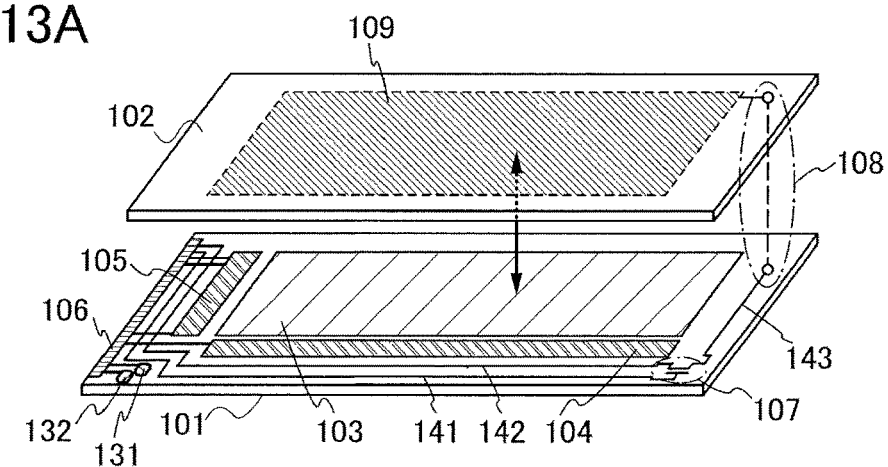
FIGS. 13A to 13C illustrate a structure of a display device.

A liquid crystal display device illustrated in FIG. 13A includes a first substrate 101 and a second substrate 102. The first substrate 101 is provided with a pixel circuit 103, a gate line driver circuit 104, a signal line driver circuit 105, a terminal portion 106, and a switching transistor 107. The second substrate 102 is provided with a common connection portion 108 (also referred to as a common contact) and a counter electrode 109.

Over the first substrate 101, the optical sensors described in Embodiment 1 are provided and connected to the terminal portion 106. An optical sensor 131 is an amorphous thin film optical sensor, and an optical sensor 132 is a polycrystalline thin film optical sensor.

It is necessary that the first substrate 101 and the second substrate 102 have a light-transmitting property and heat resistance high enough to withstand heat treatment to be performed later. A glass substrate used for electronics industry, such as an aluminosilicate glass substrate, an aluminoborosilicate glass substrate, or a barium borosilicate glass substrate (also called an "alkali-free glass substrate"), a quartz substrate, a ceramic substrate, a plastic substrate, or the like can be used.

Note that the pixel circuit 103, the gate line driver circuit 104, the signal line driver circuit 105, and the switching transistor 107 in FIG. 13A may be configured with transistors which are formed over the first substrate 101. Note that in the case where a driver circuit such as the gate line driver circuit 104, the signal line driver circuit 105, or an optical sensor driver circuit or an optical sensor reading circuit which is described in another embodiment is required to operate at higher speed or the like as the size or resolution of a display device increases, part or all of the functions of the driver circuit may be formed over a separate substrate using, for example, a single crystal semiconductor and may be connected as a whole or in a plurality of groups onto the first substrate 101, if necessary.

Note that a connection method of a driver circuit which is formed over a separate substrate is not particularly limited, and a COG method, a wire bonding method, a TAB method, or the like can be used. In this embodiment, the gate line driver circuit 104 and the signal line driver circuit 105, for which a so-called integrated circuit (IC) or large-scale integration (LSI) formed with a single crystal semiconductor is used, are connected by a COG method.

Note that in the pixel circuit 103, a plurality of gate lines and a plurality of signal lines extend from the gate line driver circuit 104 and the signal line driver circuit 105, and a plurality of pixels is provided so that the pixels are surrounded by the gate lines and the signal lines. An image signal to be supplied to pixel electrodes of the pixels is supplied to the plurality of signal lines. With the plurality of gate lines, pixel transistors are controlled so that the image signal supplied from the signal lines is selected and supplied to the pixel electrodes of the pixels. The gate line driver circuit 104 is a circuit for generating and outputting signals to be supplied to the gate lines, and the signal line driver circuit 105 is a circuit for generating and outputting signals to be supplied to the signal lines.

Note that as a display method of an image in the pixel circuit 103, a progressive method, an interlace method, or the like can be employed. Color components controlled in the pixel for color display are not limited to three colors of R, G, and B (R, Cr, and B correspond to red, green, and blue, respectively); for example, R, G, B, and W (W corresponds to white), or R, G, B, and one or more of yellow, cyan, magenta, and the like can be employed. Note that the sizes of display regions may be different between respective dots of color components. Note that an embodiment of the present invention is not limited to a liquid crystal display device for color display and is applicable to a liquid crystal display device for monochrome display.

Note that the switching transistor in this specification is an element with a transistor in which conduction or non-conduction between two terminals, i.e., a source terminal and a drain terminal, is selected in accordance with a potential applied to a gate to realize switching operation. For example, the switching transistor may be an element in which a potential to be applied to the gate terminal of the transistor is controlled such that the transistor operates in a linear region. Note that the potential to be applied to the gate of the switching transistor 107 may be supplied from the terminal portion 106 through a wiring 141. One of the source terminal and the drain terminal of the switching transistor 107, which is connected to the terminal portion 106 through a wiring 142, is referred to as a first terminal. The other of the source terminal and the drain terminal of the switching transistor 107, which is connected to the counter electrode 109 through a wiring 143 and the common connection portion 108, is referred to as a second terminal. Note that a common potential to be supplied to the counter electrode 109 is supplied to the first terminal of the switching transistor 107, and conduction or non-conduction of the switching transistor 107 is controlled by a potential applied to the gate terminal.

The wiring 141 and the wiring 142 are connected to the terminal portion 106 through a portion between the gate line driver circuit 104 and a substrate edge and between the signal line driver circuit 105 and a substrate edge, on an outer side relative to the gate line driver circuit 104 and the signal line driver circuit 105, i.e., on the side opposite to the pixel circuit 103. In this manner, by disposing the wiring 141 and the wiring 142 so as to surround the gate line driver circuit 104 and the signal line driver circuit 105, entry of external noise, damage due to static electricity, or the like can be prevented. In addition, not only the wiring 141 and the wiring 142 but also a wiring such as a $V_{dd}$ potential line, a $V_{ss}$ potential line, or a ground potential line may be used.

Note that the switching transistor may have any of the following structures: an inverted-staggered structure; a staggered structure; a double-gate structure in which a channel region is divided into a plurality of regions and the divided channel regions are connected in series; and a dual-gate structure in which gate electrodes are provided over and under a channel region. Further, a transistor element in which a plurality of island-like semiconductor layers is formed in the switching transistor to realize switching operation may be used.

Further, the terminal portion 106 is supplied with the following signals and potentials: a signal for outputting a pulse signal for performing display in the pixel circuit 103, from the gate line driver circuit 104 and the signal line driver circuit 105 (such as a start pulse SP and a clock signal); the image signal (also referred to as a video voltage, a video signal, or video data); a high power supply potential $V_{dd}$ and a low power supply potential $V_{ss}$ as power supply voltages; the common potential to be supplied to the counter electrode 109; a signal for operating the switching transistor 107; and the like.

Note that the high power supply potential $V_{dd}$ is a potential higher than a reference potential, and the low power supply potential $V_{ss}$ is a potential lower than or equal to the reference potential. Note that it is desirable that each of the high power supply potential and the low power supply potential be a potential at which a transistor can operate.

The common potential may be any potential as long as it serves as a reference with respect to a potential of an image signal supplied to a pixel electrode. For example, the common potential may be a ground potential.

The common connection portion 108 is provided for achieving electrical connection between the second terminal of the switching transistor 107 on the first substrate 101 and the counter electrode 109 on the second substrate 102. The common potential is supplied from the terminal portion 106 to the counter electrode 109 through the wiring 142, the switching transistor 107, the wiring 143, and the common connection portion 108. As a specific example of the common connection portion 108, a conductive particle with a coating of a thin metal film may be used to achieve electrical connection between the wiring 143 and the counter electrode 109. Note that two or more switching transistors 107 and common connection portions 108 may be provided between the first substrate 101 and the second substrate 102.

It is preferable that the counter electrode 109 overlap the pixel electrode included in the pixel circuit 103. Further, the counter electrode 109 and the pixel electrode included in the pixel circuit 103 may have a variety of opening patterns.

In addition, over the first substrate 101, the optical sensors described in Embodiment 1 are provided and connected to the terminal portion 106. The optical sensor 131 is an amorphous thin film optical sensor, and the optical sensor 132 is a polycrystalline thin film optical sensor.

In the case where the pixel circuit 103 and the switching transistor 107 are formed over the first substrate 101, a transistor including a purified oxide semiconductor in a channel formation region is used in each circuit. The off-state current of the transistor including a purified oxide semiconductor is extremely small.

In the case where a switching element or the like is manufactured using such a transistor whose off-state current is extremely small, the leakage hardly occurs; therefore, the leakage of electric charges at a node connected to the switching element can be reduced as much as possible. Thus, a period for holding a potential at the node can be extended.

The off-state current per micrometer of channel width of the aforementioned transistor including an oxide semiconductor can be as small as 1 aA/µm ($1 \times 10^{-18}$ A/µm) or less, furthermore 1 zA/µm ($1 \times 10^{-21}$ A/µm) or less. On the other hand, in the case of a transistor including low-temperature polysilicon, design or the like is performed on the assumption that the off-state current is approximately $1 \times 10^{-12}$ A. Therefore, in the case of the transistor including an oxide semiconductor, the potential holding period can be approximately 10000 times as long as that of the transistor including low-temperature polysilicon. Furthermore, in the case of a transistor including amorphous silicon, the off-state current per micrometer of channel width is $1 \times 10^{-13}$ A/µm or more. Therefore, the voltage holding period of the transistor including a high-purity oxide semiconductor can be $10^4$ or more times as long as that of the transistor including amorphous silicon when these transistors have storage capacitances which are equal or substantially equal to each other (approximately 0.1 pF).

Specifically, since the period for holding the image signal in each pixel can be extended in the case of using the transistor including an oxide semiconductor, a writing interval at the time of still image display can be 1 second or longer, preferably 10 seconds or longer, more preferably 30 seconds or longer, still preferably 1 minute or longer and shorter than 10 minutes. That is, the extension of the holding period can reduce the frequency of supply of the image signal and the common potential to the pixel electrode and the counter electrode, particularly when a still image is displayed. Thus, a reduction in power consumption can be achieved.

Note that in still image display, refresh operation may be performed as appropriate considering a holding rate of a voltage applied to a liquid crystal element during a holding period. For example, refresh operation may be performed at the timing when a voltage is decreased to a predetermined level with respect to the value of voltage (initial value) shortly after a signal is written to a pixel electrode of a liquid crystal element. The predetermined level is preferably set to a voltage at which flicker is not sensed with respect to the initial value. Specifically, in the case where a display object is an image, refresh operation (rewrite) is preferably performed every time the voltage becomes 1.0%, preferably 0.3%, lower than the initial value. In the case where a display object is text, refresh operation (rewrite) is preferably performed every time the voltage becomes 10%, preferably 3%, lower than the initial value.

For example, in the case of a pixel having the transistor including low-temperature polysilicon, image display is generally performed at 60 frames per second (for 16 msec per frame). The same applies to the case of a still image for the reason that a decrease in rate (an extension of writing interval) causes a decrease in voltage of a pixel and a defect of display. On the other hand, in the case of using the above-described transistor including an oxide semiconductor, the holding period per signal writing can be extended to approximately 160 seconds which is $10^4$ times as long as that of the transistor including low-temperature polysilicon since the off-state current is small.

In this manner, still image display can be performed in a display portion even by less frequent writing of image signals. Since the holding period can be extended, the frequency of performing writing of signals can be decreased particularly when a still image is displayed. For example, the number of times of signal writing to a pixel in a display period of one still image can be one or n (n is greater than or equal to 2 and less than or equal to $10^3$). Thus, a reduction in power consumption of a display device can be achieved.

Note that the resistance to flow of off-state current in a transistor can be referred to as off-state resistivity. The off-state resistivity is the resistivity of a channel formation region when the transistor is off, which can be calculated from the off-state current.

Specifically, the resistance of the transistor in an off state (off-state resistance R) can be calculated using Ohm's law from the off-state current and the drain voltage, which leads to the off-state resistivity $\rho$ which can be calculated using Formula, $\rho=RA/L$ (R is the off-state resistance), from the cross-sectional area A of the channel formation region and the length L of the channel formation region (which corresponds to the distance between a source electrode and a drain electrode).

The cross-sectional area A can be calculated from A=dW where d is the thickness of the channel formation region and W is the channel width. The length L of the channel formation region is the channel length L. In this manner, the off-state resistivity can be calculated from the off-state current.

The off-state resistivity of the transistor including the oxide semiconductor in this embodiment is preferably $1\times10^9$ $\Omega\cdot m$ or more, more preferably $1\times10^{10}$ $\Omega\cdot m$ or more.

Note that in the case of a liquid crystal display device which performs display by alternately switching a still image and a moving image, the supply of the signal for outputting a pulse signal for performing display in the pixel circuit 103 to the gate line driver circuit 104 and the signal line driver circuit 105, and the conduction or non-conduction of the switching transistor are controlled, and the supply or stop of a pulse signal from each driver circuit and the conduction or non-conduction of the switching transistor are repeated. Thus, a reduction in power consumption can be achieved.

Note that the moving image refers to an image which is recognized as a moving image with human eyes by rapid switching of a plurality of images which are time-divided into a plurality of frames. Specifically, the moving image refers to a series of image signals which are recognized as a moving image with less flicker with human eyes by switching images at least 60 times (60 frames) per second. On the other hand, the still image refers to image signals which do not change in a series of frame periods, for example, in the n-th frame and (n+1)-th frame, unlike the moving image, although a plurality of images which are time-divided into a plurality of frame periods are switched rapidly.

Note that in the case of a liquid crystal display device which performs display by alternately switching a still image and a moving image, whether an image is a moving image or a still image may be determined by comparison between images in frames which is performed in another substrate or the like. For example, a memory circuit and a comparison circuit may be provided, so that image signals in a series of frame periods may be selectively read out in every frame from the memory circuit which is separately provided in order to store image signals, and the image signals may be compared by the comparison circuit. Further, a circuit for determining an image to be a moving image when a difference is detected by the comparison circuit and determining an image to be a still image when a difference is not detected by the comparison circuit may be provided. Specifically, when an image is determined to be a moving image by the comparison circuit, that is, when a difference between image signals in a series of frames is detected, the image signals and the common potential are supplied to the pixels in the pixel circuit 103 and the counter electrode. On the other hand, when an image is determined to be a still image by the comparison circuit, that is, a difference between image signals in a series of frames is not detected, the supply of the image signals and the common potential to the pixels in the pixel circuit 103 and the counter electrode is stopped. In the case where an image is determined to be a still image, the supply of the image signals, and in addition, the supply of power supply voltages such as the high power supply potential $V_{dd}$ and the low power supply potential $V_{ss}$ are stopped. Thus, a further reduction in power consumption can be achieved.

Note that the supply of image signals, power supply voltages, and a common potential refers to the supply of a predetermined potential to a wiring. In addition, the stop of supply of power supply voltages refers to the stop of supply of a predetermined potential, for example, the high power supply potential $V_{dd}$ to a wiring and the connection of the wiring to a wiring supplied with another fixed potential, for example, a wiring supplied with the low power supply potential $V_{ss}$ or the common potential so as not to generate a potential which enables a circuit connected to the wiring or an element included in the circuit to operate. The stop of supply of image signals and a common potential also refers to the electrical disconnection from a wiring supplied with a predetermined potential to bring the wiring into a floating state.

It is preferable that the stop of supply of the image signals and the common potential be performed entirely in the period for holding an image signal in each pixel in the pixel circuit 103, and the image signals and the common potential be supplied again after the holding period of each pixel.

Figure 13B:
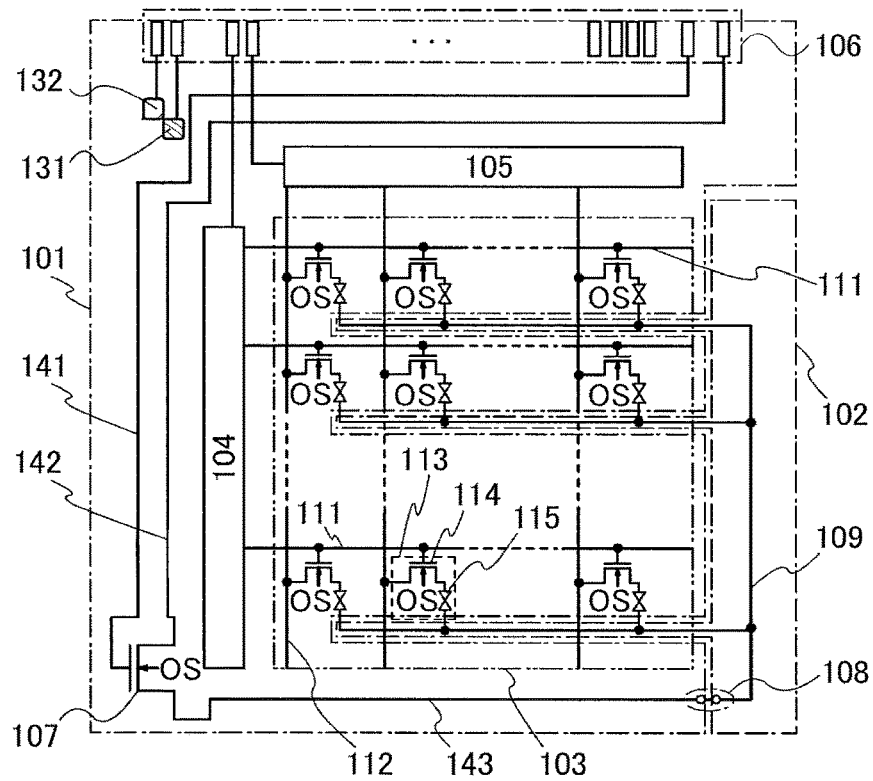

FIG. 13B is a circuit diagram of the schematic view of the liquid crystal display device of FIG. 13A, in which the structure of the pixel circuit 103 is particularly illustrated in more detail.

The liquid crystal display device illustrated in FIG. 13B includes the first substrate 101 and the second substrate 102 as in FIG. 13A. The first substrate 101 is provided with the pixel circuit 103, the gate line driver circuit 104, the signal line driver circuit 105, the terminal portion 106, and the switching transistor 107. The second substrate 102 is provided with the common connection portion 108 and the counter electrode 109.

In FIG. 13B, a plurality of gate lines 111 and a plurality of signal lines 112 are arranged in matrix in the pixel circuit 103, and the gate lines 111 and the signal lines 112 are provided with pixels 113 each including a pixel transistor 114 and a liquid crystal element 115 in which a liquid crystal is interposed between a first electrode and a second electrode. In FIG. 13B, one of a source terminal and a drain terminal of the pixel transistor 114 is referred to as a first terminal, and the other of the source terminal and the drain terminal is referred to as a second terminal. The first terminal is connected to the signal line 112. The gate terminal is connected to the gate line 111. The second terminal is connected to the first electrode of the liquid crystal element 115. Note that the first electrode of the liquid crystal element 115 corresponds to the pixel electrode, and the second electrode of the liquid crystal element 115 corresponds to the counter electrode 109.

Note that a semiconductor layer of the pixel transistor 114 included in the pixel is formed using an oxide semiconductor, as that of the switching transistor 107. With the use of an oxide semiconductor in a pixel transistor, an off-state current which flows through the pixel transistor can be significantly reduced, and a period for holding a potential corresponding to an image signal supplied to a pixel electrode can be extended.

Figure 13C:
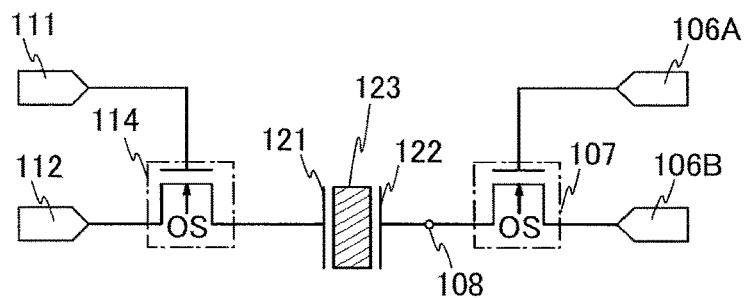

FIG. 13C is a circuit diagram of one pixel of pixels including pixel electrodes. The circuit diagram illustrated in FIG. 13C focuses on the pixel transistor 114 and the switching transistor 107. The gate terminal of the pixel transistor 114 is connected to the gate line 111. The first terminal of the pixel transistor 114 is connected to the signal line 112. The second terminal of the pixel transistor 114 is connected to the pixel electrode 121. The gate terminal of the switching transistor 107 is connected to a terminal 106A of the terminal portion 106. The first terminal of the switching transistor 107 is connected to a terminal 106B of the terminal portion 106. The second terminal of the switching transistor 107 is electrically connected to a counter electrode 122 through the common connection portion 108. Note that a liquid crystal 123 is interposed between the pixel electrode 121 and the counter electrode 122. The pixel electrode 121, the counter electrode 122, and the liquid crystal 123 may be collectively referred to as a liquid crystal element.

Note that in FIG. 13C, a storage capacitor may be connected to the liquid crystal element in parallel. The size of the storage capacitor may be set considering the leakage current of a transistor provided in a pixel portion or the like so that electric charges can be held for a predetermined period. The size of the storage capacitor may be set considering the off-state current of a transistor or the like. In this embodiment, because a transistor including a high-purity oxide semiconductor is used as the transistor, it is sufficient to provide a storage capacitor having a capacitance which is ⅓ or less, preferably ⅕ or less, of a liquid crystal capacitance in each pixel.

As the liquid crystal 123, a thermotropic liquid crystal, a low-molecular liquid crystal, a high-molecular liquid crystal, a polymer dispersed liquid crystal, a ferroelectric liquid crystal, an anti-ferroelectric liquid crystal, or the like is used. These liquid crystal materials exhibit a cholesteric phase, a smectic phase, a cubic phase, a chiral nematic phase, an isotropic phase, or the like depending on conditions.

The specific resistivity of the liquid crystal 123 is $1\times10^{10}$ Ω·cm or more, preferably more than $1\times10^{11}$ Ω·cm, more preferably more than $1\times10^{12}$ Ω·cm. Note that the specific resistivity in this specification is measured at 20° C. In the case of using a liquid crystal element (also called a liquid crystal cell) in which a liquid crystal is interposed between electrodes, the specific resistivity of the liquid crystal may be $1\times10^{9}$ Ω·cm or more, preferably more than $1\times10^{10}$ Ω·cm in some cases because there is a possibility that an impurity may be mixed into the liquid crystal from an alignment film, a sealant, or the like.

As the specific resistivity of a liquid crystal material becomes higher, more charges leaking through the liquid crystal material can be reduced, and a decrease over time in voltage for holding an operation state of the liquid crystal element can be suppressed. As a result, the holding period can be extended, the frequency of signal writing can be decreased, and power consumption of the liquid crystal display device can be reduced.

Further, as the liquid crystal 123, a liquid crystal material exhibiting a blue phase may be used. A blue phase is one of liquid crystal phases, which appears just before a cholesteric phase changes into an isotropic phase while temperature of cholesteric liquid crystal is increased. Since the blue phase only appears within a narrow range of temperatures, a liquid crystal composition containing a chiral agent at greater than or equal to 5 wt % is used for the liquid crystal layer in order to widen the temperature range. The liquid crystal composition which includes a liquid crystal exhibiting a blue phase and a chiral agent has a short response time of 1 msec or less, has optical isotropy, which makes the alignment process unneeded, and has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced. Thus, productivity of the liquid crystal display device can be increased. A transistor including an oxide semiconductor particularly has a possibility that electrical characteristics of the transistor may significantly change and deviate from the designed range by the influence of static electricity. Therefore, it is more effective to use a blue phase liquid crystal material for a liquid crystal display device having a transistor including an oxide semiconductor.

In addition, a structure of this embodiment is not limited to a liquid crystal display device and can also be applied to a self light emitting display device which includes a light emitting element such as an electroluminescent element (also referred to as an EL element) as a display element. In the case of a self light emitting display device, although charges need to be constantly supplied to a light emitting element at the time of image display, a driver circuit can be stopped at the time of still image display by stopping the supply of a clock signal and a start pulse to be supplied to the driver circuit. Thus, a reduction in power consumption can be achieved.

Figure 14:
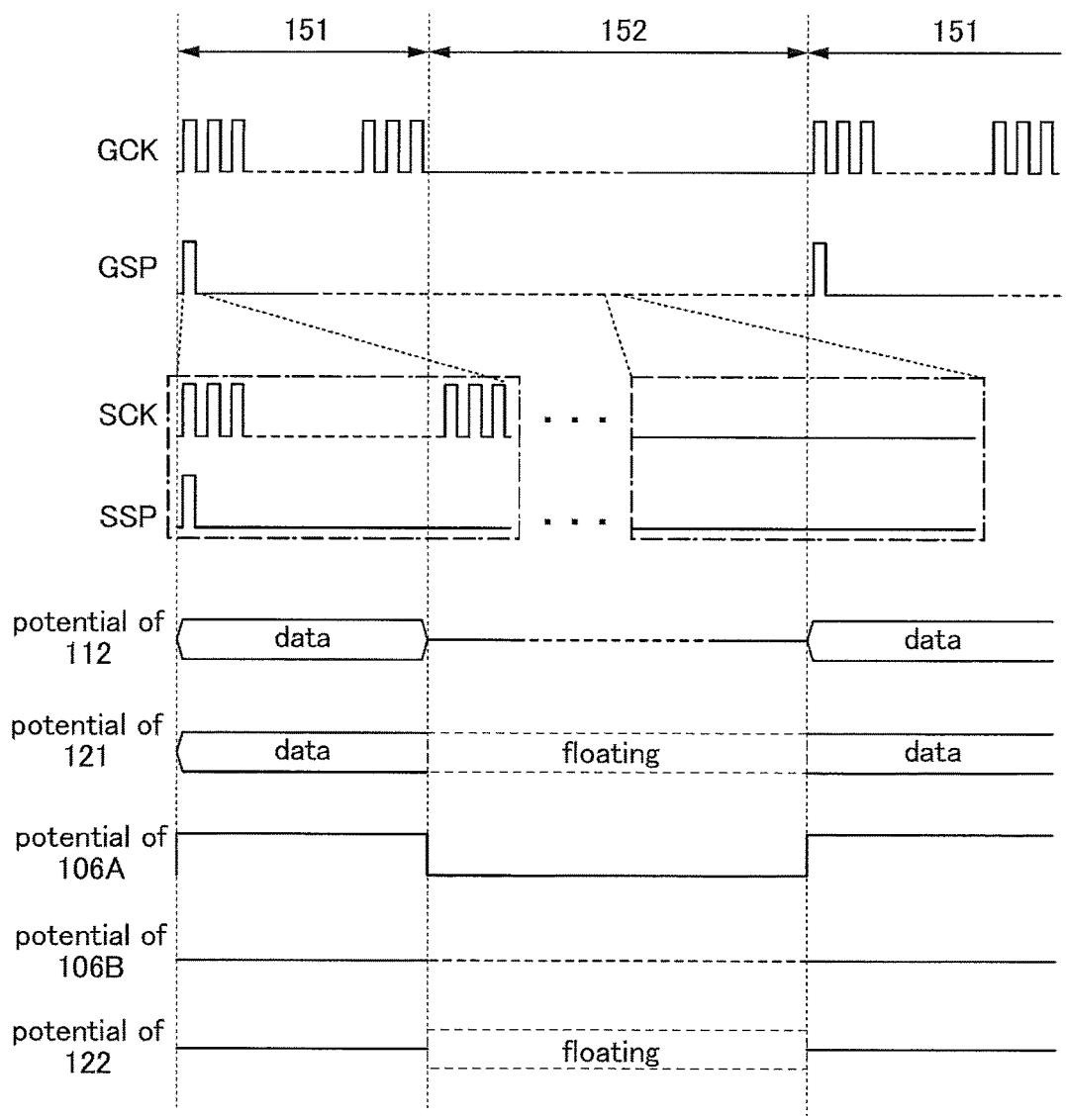
FIG. 14 is a timing chart illustrating operation of a display device.

FIG. 14 is a timing chart illustrating the state of signals supplied to the terminals, the gate line driver circuit 104, and the signal line driver circuit 105 in the circuit diagram in FIG. 13C. Note that in order to describe an example of the timing chart, a period 151 in FIG. 14 is regarded as a moving image writing period and a period 152 in FIG. 14 is regarded as a still image display period. The period in FIG. 14 may be determined to be either the moving image writing period or the still image display period in accordance with the result of determination as to whether an image is a moving image or a still image. In FIG. 14, GCK refers to a clock signal supplied to the gate line driver circuit 104; GSP refers to a start pulse supplied to the gate line driver circuit 104; SCK refers to a clock signal supplied to the signal line driver circuit 105; and SSP refers to a start pulse supplied to the signal line driver circuit 105. A potential of the signal line 112, a potential of the pixel electrode 121, a potential of the terminal 106A, a potential of the terminal 106B, and a potential of the counter electrode 122 are also illustrated in FIG. 14.

Note that the moving image writing period, which is the period 151, corresponds to a period where a difference is detected by the comparison of the image signals of the series of frame periods, and the still image writing period, which is the period 152, corresponds to a period where a difference is not detected by the comparison of the image signals of the series of frame periods. Thus, in the period 151, operation is performed such that the image signals and the common potential are supplied to the pixels in the pixel circuit 103 and the counter electrode. On the other hand, in the period 152, the supply of the image signals and the common potential to the pixels in the pixel circuit 103 and the counter electrode is stopped.

Specifically, in the period 151, a clock signal is supplied at all times as the clock signal GCK as illustrated in FIG. 14, and a pulse is supplied in accordance with a vertical synchronizing frequency as the start pulse GSP as illustrated in FIG. 14. In addition, in the period 151, a clock signal is supplied at all times as the clock signal SCK as illustrated in FIG. 14; a pulse is supplied in accordance with one gate selection period as the start pulse SSP as illustrated in FIG. 14; an image signal "data" which is to be supplied to pixels of each row is supplied to the signal line 112, and the potential of the signal line 112 is supplied to the pixel electrode 121 in the pixel in accordance with the potential of the gate line 111, as illustrated in FIG. 14; and a potential at which the switching transistor 107 is turned on is supplied to the terminal 106A corresponding to the gate terminal of the switching transistor 107, and the common potential which is the potential of the terminal 106B is supplied to the counter electrode 122, as illustrated in FIG. 14.

In the period 152, the supply of both the clock signal GCK and the start pulse GSP is stopped as illustrated in FIG. 14; the supply of both the clock signal SCK and the start pulse SSP is also stopped as illustrated in FIG. 14; and the supply of the image signal "data" to the signal line 112 is also stopped as illustrated in FIG. 14. In addition, as illustrated in FIG. 14, the supply of both the clock signal GCK and the start pulse GSP is stopped; accordingly, the pixel transistor 114 is turned off, the supply of the image signal "data" is stopped, and the pixel electrode 121 is brought into a floating state. Furthermore, a potential at which the switching transistor 107 is turned off is supplied to the terminal 106A corresponding to the gate terminal of the switching transistor 107; thus, the supply of the common potential which is the potential of the terminal 106B is stopped. Accordingly, the counter electrode 122 is brought into a floating state.

That is, in the period 152, electrodes on both sides of the liquid crystal 123, i.e., the pixel electrode 121 and the counter electrode 122, are brought into a floating state; thus, a still image can be displayed without additional potential supply in the period 152. By stopping the supply of a clock signal and a start pulse to the gate line driver circuit 104 and the signal line driver circuit 105, a reduction in power consumption can be achieved.

With the use of a transistor including an oxide semiconductor capable of significantly reducing off-state current as the pixel transistor 114 and the switching transistor 107, a change in potential of the liquid crystal element when both terminals of the liquid crystal element are in a non-conduction state can be drastically reduced.

As described above, the off-state current of the transistor including the oxide semiconductor can be made 0.1 fA or less. Therefore, the holding period where the pixel electrode 121 and the counter electrode 122 are brought into a floating state can be extended as compared to a transistor including amorphous silicon or the like in a semiconductor layer. Accordingly, a synergistic effect is expected to be generated in reduction of power consumption at the time of still image display in this embodiment.

Note that the resistivity of the liquid crystal 123 in FIG. 13C is approximately $1\times10^{10}$ Ω·cm to $1\times10^{11}$ Ω·cm. In the period 152 in FIG. 14, the electrodes on both sides of the liquid crystal 123, i.e., the pixel electrode 121 and the counter electrode 122, are brought into a floating state with the use of a transistor which has almost no off-state current. Thus, off-state current which flows through the liquid crystal 123 due to a voltage applied between both sides of the liquid crystal 123 can be reduced.

Consequently, a liquid crystal display device can be obtained, in which a reduction in power consumption is achieved and image distortion is reduced at the time of still image display.

This embodiment can be implemented in appropriate combination with any of the structures described in the other embodiments.

Embodiment 5

In this embodiment, examples of electronic devices including any of the display devices of the above embodiments are described.

Figure 19A:
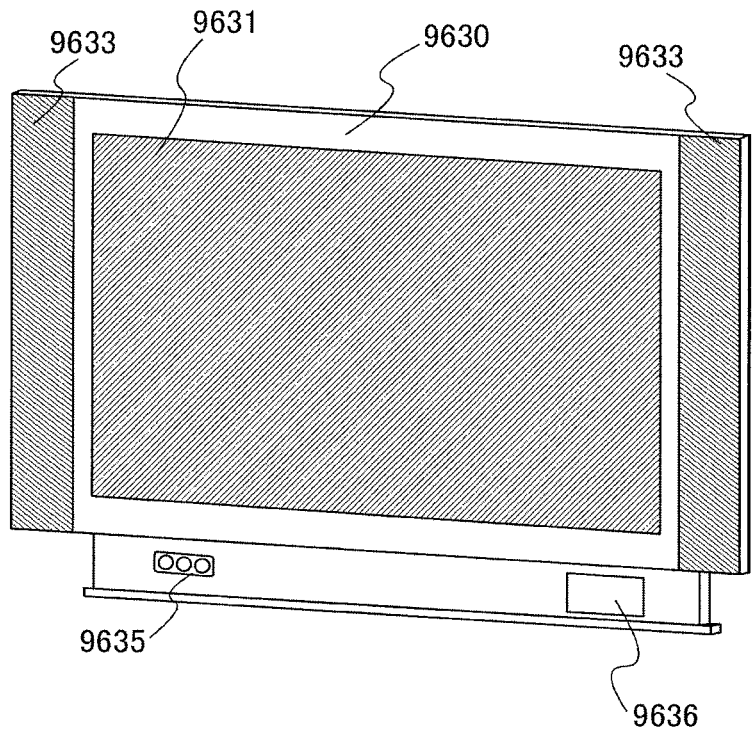
FIGS. 19A and 19B each illustrate an electronic device.

FIG. 19A illustrates a television set, which can include a housing 9630, a display portion 9631, speakers 9633, operation keys 9635, a connection terminal 9636, and the like. The television set in FIG. 19A can have the function of processing and converting an electric wave for television into an image signal, the function of processing and converting the image signal into a signal suitable for display, the function of converting a frame frequency of the image signal, and the like. Although not illustrated, the display portion 9631 has the structure described in Embodiment 2 and includes the optical sensors. The television set in FIG. 19A can have various functions besides those given above. With the use of the structure described in the above embodiment, the amount of light or the color temperature therearound is detected and an easily viewable display condition can be always obtained. In addition, a stable image with less image distortion can be obtained while a reduction in power consumption is also achieved.

In this manner, with the use of the amorphous thin film optical sensor and the polycrystalline thin film optical sensor which have different optical sensitivities to visible light, the ambient illuminance is accurately detected and the luminance of the display device is optimized, whereby a change in luminance sensed by a user can be reduced and an increase in power consumption can be suppressed. In addition, with a difference between the outputs of the amorphous thin film optical sensor and the polycrystalline thin film optical sensor, the infrared light illuminance is detected and the color tone of the display portion is corrected, whereby display quality can be improved.

Figure 19B:
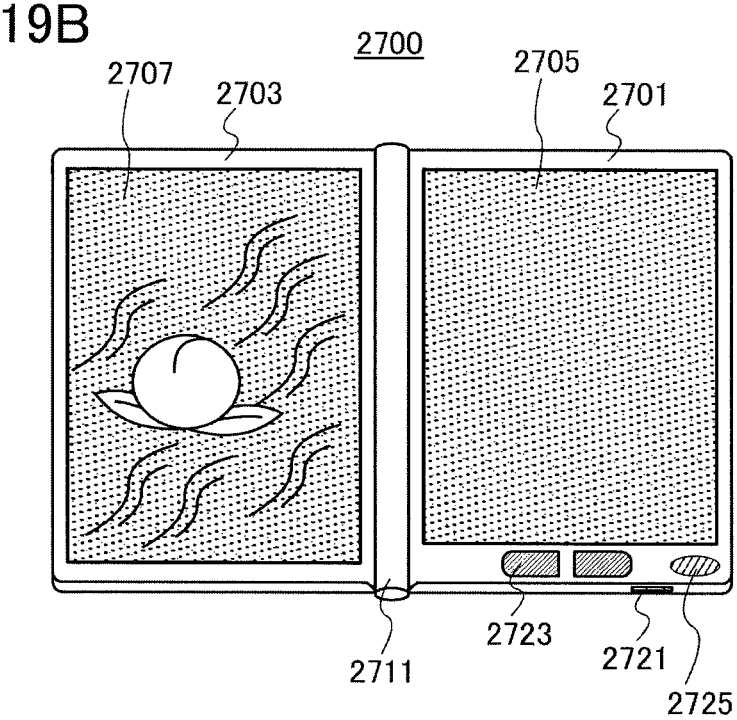

FIG. 19B illustrates an example of an electronic book. For example, an electronic book 2700 includes two housings, a housing 2701 and a housing 2703. The housing 2701 and the housing 2703 are combined by a hinge 2711 so that the electronic book 2700 can be opened and closed with the hinge 2711 used as an axis. With such a structure, the electronic book 2700 can operate like a paper book.

A display portion 2705 is incorporated in the housing 2701. A display portion 2707 is incorporated in the housing 2703. Although not illustrated, the display portion 2705 and the display portion 2707 have the structure described in Embodiment 2 and include the optical sensors. The display portion 2705 and the display portion 2707 may display one image or different images. When the display portions display different images, text can be displayed on the right display portion (the display portion 2705 in FIG. 19B) and an image can be displayed on the left display portion (the display portion 2707 in FIG. 19B), for example.

Further, FIG. 19B illustrates an example where the housing 2701 is provided with an operation portion and the like. For example, the housing 2701 is provided with a power supply switch 2721, operation keys 2723, a speaker 2725, and the like. Pages can be turned with the operation keys 2723. Note that a keyboard, a pointing device, or the like may be provided on the same side as the display portion in the housing. Moreover, an external connection terminal (e.g., an earphone terminal, a USB terminal, and a terminal connectable to an AC adapter and a variety of cables such as a USB cable), a recording media insertion portion, or the like may be provided on a rear surface or a side surface of the housing. Furthermore, the electronic book 2700 may function as an electronic dictionary.

In addition, the electronic book 2700 may be configured to be able to wirelessly transmit and receive information. The electronic book 2700 can have a structure where desired book data or the like are wirelessly purchased and downloaded from an electronic book server.

With the use of the structure described in the above embodiment, the amount of light or the color temperature therearound is detected and an easily viewable display condition can be always obtained. In addition, a stable image with less image distortion can be obtained while a reduction in power consumption is also achieved.

This application is based on Japanese Patent Application serial no. 2009-288511 filed with Japan Patent Office on Dec. 18, 2009, the entire contents of which are hereby incorporated by reference.

The invention claimed is:

1. A method for driving a display device comprising a first substrate provided with a terminal portion, a pixel electrode, a switching transistor, a first optical sensor, and a second optical sensor, and a second substrate provided with a counter electrode, the method comprising the steps of:
   detecting an illuminance around the display device by using the first optical sensor and the second optical sensor; and
   adjusting a luminance of a display image in accordance with the illuminance,
   wherein the switching transistor comprises an oxide semiconductor,
   wherein the first optical sensor has a maximum sensitivity at a wavelength of approximately 0.6 μm, and detects visible light,
   wherein the second optical sensor has a maximum sensitivity at a wavelength of approximately 0.7 μm, and detects visible light and infrared light,
   wherein the second optical sensor has lower optical sensitivity to visible light than the first optical sensor, and
   wherein a potential is supplied from the terminal portion to the counter electrode through the switching transistor.

2. The method for driving the display device according to claim 1, wherein the illuminance is detected by using the first optical sensor in the case where a signal which the first optical sensor outputs is not saturated, or by using the second optical sensor in the case where a signal which the first optical sensor outputs is saturated.

3. The method for driving the display device according to claim 1, further comprising the step of:
   detecting an infrared light illuminance around the display device with use of a difference between outputs of the first optical sensor and the second optical sensor.

4. The method for driving the display device according to claim 1, wherein the switching transistor is turned off in a period for displaying a still image so that the counter electrode is in a floating state.

5. A method for driving a display device comprising a first substrate provided with a terminal portion, a pixel electrode, a switching transistor, a first optical sensor, and a second optical sensor, and a second substrate provided with a counter electrode, the method comprising the steps of:
   detecting a color temperature around the display device by using the first optical sensor or the second optical sensor, and
   correcting a color tone of a display image in accordance with the color temperature,
   wherein the switching transistor comprises an oxide semiconductor,
   wherein the first optical sensor has a maximum sensitivity at a wavelength of approximately 0.6 μm, and detects visible light,
   wherein the second optical sensor has a maximum sensitivity at a wavelength of approximately 0.7 μm, and detects visible light and infrared light,
   wherein the second optical sensor has lower optical sensitivity to visible light than the first optical sensor, and
   wherein a potential is supplied from the terminal portion to the counter electrode through the switching transistor.

6. The method for driving the display device according to claim 5, wherein the color temperature detected by using the first optical sensor in the case wherein a signal which the first optical sensor outputs is not saturated, or by using the second optical sensor in the case wherein a signal which the first optical sensor outputs is saturated.

7. The method for driving the display device according to claim 5, further comprising the step of:
   detecting an infrared light color tone around the display device with use of a difference between outputs of the first optical sensor and the second optical sensor.

8. The method for driving a display device according to claim 5, wherein the switching transistor is turned off in a period for displaying a still image so that the counter electrode is in a floating state.

9. A method for driving a display device comprising a first substrate provided with a terminal portion, a pixel electrode, a switching transistor, a first optical sensor, a second optical sensor, and a second substrate provided with a counter electrode, the method comprising the steps of:
   detecting an illuminance around the display device by using the first optical sensor and the second optical sensor; and
   adjusting a luminance of a display image in accordance with the illuminance,
   wherein the switching transistor comprises an oxide semiconductor, wherein the first optical sensor has a maximum sensitivity at a wavelength of approximately 0.6 μm, and detects visible light, wherein the second optical sensor has a maximum sensitivity at a wavelength of approximately 0.7 μm, and detects visible light and infrared light, and wherein a potential is supplied from the terminal portion to the counter electrode through the switching transistor.

10. The method for driving the display device according to claim 9, further comprising the step of:

detecting an infrared light illuminance around the display device with use of a difference between outputs of the first optical sensor and the second optical sensor.

11. The method for driving the display device according to claim 10, further comprising the step of:

correcting a color tone of the display image in accordance with the infrared light illuminance.

12. The method for driving the display device according to claim 9, wherein the switching transistor is turned off in a period for displaying a still image so that the counter electrode is in a floating state.

13. The method for driving the display device according to claim 9, wherein the second optical sensor has a lower optical sensitivity to visible light than the first optical sensor.

14. The method for driving the display device according to claim 13, wherein the illuminance is detected by using the first optical sensor in the case where a signal which the first optical sensor outputs is not saturated, or by using the second optical sensor in the case where a signal which the first optical sensor outputs is saturated.

15. The method for driving the display device according to claim 1, wherein the first optical sensor comprises a first photoelectric conversion element comprising amorphous silicon, and wherein the second optical sensor comprises a second photoelectric conversion element comprising polycrystalline silicon.

16. The method for driving the display device according to claim 5, wherein the first optical sensor comprises a first photoelectric conversion element comprising amorphous silicon, and wherein the second optical sensor comprises a second photoelectric conversion element comprising polycrystalline silicon.

17. The method for driving the display device according to claim 9, wherein the first optical sensor comprises a first photoelectric conversion element comprising amorphous silicon, and wherein the second optical sensor comprises a second photoelectric conversion element comprising polycrystalline silicon.

* * * * *